(12) United States Patent
Naletov et al.

(10) Patent No.: US 10,715,806 B2
(45) Date of Patent: *Jul. 14, 2020

(54) SYSTEMS, METHODS, AND MEDIA FOR TRANSCODING VIDEO DATA

(71) Applicant: DIVX, LLC, San Diego, CA (US)

(72) Inventors: Ivan Vladimirovich Naletov, Tomsk (RU); Sergey Zurpal, Seversk (RU)

(73) Assignee: DIVX, LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/298,345

(22) Filed: Mar. 11, 2019

(65) Prior Publication Data
US 2019/0268596 A1    Aug. 29, 2019

Related U.S. Application Data

(63) Continuation of application No. 15/905,695, filed on Feb. 26, 2018, now Pat. No. 10,264,255, which is a continuation of application No. 13/841,943, filed on Mar. 15, 2013, now Pat. No. 9,906,785.

(51) Int. Cl.
| | |
|---|---|
| *H04N 11/02* | (2006.01) |
| *H04N 19/12* | (2014.01) |
| *H04N 19/139* | (2014.01) |
| *H04N 19/157* | (2014.01) |
| *H04N 19/177* | (2014.01) |

(Continued)

(52) U.S. Cl.
CPC .......... *H04N 19/12* (2014.11); *H04N 19/139* (2014.11); *H04N 19/14* (2014.11); *H04N 19/157* (2014.11); *H04N 19/177* (2014.11); *H04N 19/40* (2014.11)

(58) Field of Classification Search
CPC ....................................................... H04N 19/12
USPC ......................................... 375/240.01–240.29
See application file for complete search history.

(56) References Cited

U.S. PATENT DOCUMENTS

| | | | |
|---|---|---|---|
| 4,009,331 A | 2/1977 | Goldmark et al. | |
| 4,694,357 A | 9/1987 | Rahman et al. | |
| 4,802,170 A | 1/1989 | Trottier | |

(Continued)

FOREIGN PATENT DOCUMENTS

| | | |
|---|---|---|
| AU | 2010203605 B2 | 5/2015 |
| CA | 2823829 C | 1/2019 |

(Continued)

OTHER PUBLICATIONS

Nelson, "Smooth Streaming Deployment Guide", Microsoft Expression Encoder, Aug. 2010, 66 pgs.

(Continued)

*Primary Examiner* — Leron Beck
(74) *Attorney, Agent, or Firm* — KPPB LLP

(57) ABSTRACT

Methods, systems, and computer readable media for transcoding video data based on metadata are provided. In some embodiments, methods for transcoding video data using metadata are provided, the methods comprising: receiving a first plurality of encoded images from a storage device; decoding the first plurality of encoded images based on a first coding scheme to generate a plurality of decoded images; receiving a plurality of encoding parameters from the storage device; and encoding the plurality of decoded images into a second plurality of encoded images based on a second coding scheme and the plurality of encoding parameters.

21 Claims, 5 Drawing Sheets

(51) Int. Cl.
*H04N 19/40* (2014.01)
*H04N 19/14* (2014.01)

(56) References Cited

U.S. PATENT DOCUMENTS

| | | | |
|---|---|---|---|
| 4,964,069 A | 10/1990 | Ely | |
| 5,119,474 A | 6/1992 | Beitel et al. | |
| 5,274,758 A | 12/1993 | Beitel et al. | |
| 5,361,332 A | 11/1994 | Yoshida et al. | |
| 5,396,497 A | 3/1995 | Veltman | |
| 5,404,436 A | 4/1995 | Hamilton | |
| 5,420,801 A | 5/1995 | Dockter et al. | |
| 5,420,974 A | 5/1995 | Morris et al. | |
| 5,471,576 A | 11/1995 | Yee | |
| 5,479,303 A | 12/1995 | Suzuki et al. | |
| 5,487,167 A | 1/1996 | Dinallo et al. | |
| 5,502,766 A | 3/1996 | Boebert et al. | |
| 5,509,070 A | 4/1996 | Schull | |
| 5,533,021 A | 7/1996 | Branstad et al. | |
| 5,537,408 A | 7/1996 | Branstad et al. | |
| 5,539,908 A | 7/1996 | Chen et al. | |
| 5,541,662 A | 7/1996 | Adams et al. | |
| 5,583,652 A | 12/1996 | Ware | |
| 5,589,993 A | 12/1996 | Naimpally et al. | |
| 5,621,794 A | 4/1997 | Matsuda et al. | |
| 5,627,936 A | 5/1997 | Prasad | |
| 5,633,472 A | 5/1997 | DeWitt et al. | |
| 5,642,171 A | 6/1997 | Baumgartner et al. | |
| 5,655,117 A | 8/1997 | Goldberg et al. | |
| 5,664,044 A | 9/1997 | Ware | |
| 5,675,382 A | 10/1997 | Bauchspies | |
| 5,675,511 A | 10/1997 | Prasad et al. | |
| 5,684,542 A | 11/1997 | Tsukagoshi | |
| 5,715,403 A | 2/1998 | Stefik | |
| 5,717,816 A | 2/1998 | Boyce et al. | |
| 5,719,786 A | 2/1998 | Nelson et al. | |
| 5,745,643 A | 4/1998 | Mishina | |
| 5,751,280 A | 5/1998 | Abbott | |
| 5,754,648 A | 5/1998 | Ryan et al. | |
| 5,763,800 A | 6/1998 | Rossum et al. | |
| 5,765,164 A | 6/1998 | Prasad et al. | |
| 5,794,018 A | 8/1998 | Vrvilo et al. | |
| 5,805,700 A | 9/1998 | Nardone et al. | |
| 5,822,524 A | 10/1998 | Chen et al. | |
| 5,828,370 A | 10/1998 | Moeller et al. | |
| 5,841,432 A | 11/1998 | Carmel et al. | |
| 5,844,575 A | 12/1998 | Reid | |
| 5,848,217 A | 12/1998 | Tsukagoshi et al. | |
| 5,867,625 A | 2/1999 | McLaren | |
| 5,887,110 A | 3/1999 | Sakamoto et al. | |
| 5,892,900 A | 4/1999 | Ginter et al. | |
| 5,903,261 A | 5/1999 | Walsh et al. | |
| 5,907,597 A | 5/1999 | Mark | |
| 5,946,446 A | 8/1999 | Yanagihara | |
| 5,956,729 A | 9/1999 | Goetz et al. | |
| 5,959,690 A | 9/1999 | Toebes, VIII et al. | |
| 5,970,147 A | 10/1999 | Davis | |
| 5,999,812 A | 12/1999 | Himsworth | |
| 6,031,622 A | 2/2000 | Ristow et al. | |
| 6,038,257 A | 3/2000 | Brusewitz et al. | |
| 6,044,469 A | 3/2000 | Horstmann | |
| 6,046,778 A | 4/2000 | Nonomura et al. | |
| 6,047,100 A | 4/2000 | McLaren | |
| 6,058,240 A | 5/2000 | McLaren | |
| 6,064,794 A | 5/2000 | McLaren et al. | |
| 6,065,050 A | 5/2000 | DeMoney | |
| 6,018,611 A | 6/2000 | Nogami et al. | |
| 6,079,566 A | 6/2000 | Eleftheriadis et al. | |
| 6,097,877 A | 8/2000 | Katayama et al. | |
| 6,141,754 A | 10/2000 | Choy | |
| 6,155,840 A | 12/2000 | Sallette | |
| 6,169,242 B1 | 1/2001 | Fay et al. | |
| 6,175,921 B1 | 1/2001 | Rosen | |
| 6,195,388 B1 | 2/2001 | Choi et al. | |
| 6,204,883 B1 | 3/2001 | Tsukagoshi, I | |
| 6,222,981 B1 | 4/2001 | Rijckaert | |
| 6,282,653 B1 | 8/2001 | Berstis et al. | |
| 6,289,450 B1 | 9/2001 | Pensak et al. | |
| 6,292,621 B1 | 9/2001 | Tanaka et al. | |
| 6,308,005 B1 | 10/2001 | Ando et al. | |
| 6,330,286 B1 | 12/2001 | Lyons et al. | |
| 6,374,144 B1 | 4/2002 | Viviani et al. | |
| 6,389,218 B2 | 5/2002 | Gordon et al. | |
| 6,389,473 B1 | 5/2002 | Carmel et al. | |
| 6,395,969 B1 | 5/2002 | Fuhrer | |
| 6,397,230 B1 | 5/2002 | Carmel et al. | |
| 6,418,270 B1 | 7/2002 | Steenhof et al. | |
| 6,441,754 B1 * | 8/2002 | Wang | H04N 5/76 341/50 |
| 6,449,719 B1 | 9/2002 | Baker | |
| 6,466,671 B1 | 10/2002 | Maillard et al. | |
| 6,466,733 B1 | 10/2002 | Kim | |
| 6,510,513 B1 | 1/2003 | Danieli | |
| 6,510,554 B1 | 1/2003 | Gordon et al. | |
| 6,532,262 B1 * | 3/2003 | Fukuda | H04N 19/61 375/240.03 |
| 6,621,979 B1 | 9/2003 | Eerenberg et al. | |
| 6,625,320 B1 * | 9/2003 | Nilsson | H04N 19/40 382/238 |
| 6,658,056 B1 | 12/2003 | Duruöz et al. | |
| 6,665,835 B1 | 12/2003 | Gutfreund et al. | |
| 6,671,408 B1 | 12/2003 | Kaku | |
| 6,697,568 B1 | 2/2004 | Kaku | |
| 6,725,281 B1 | 4/2004 | Zintel et al. | |
| 6,771,703 B1 | 8/2004 | Oguz et al. | |
| 6,807,306 B1 | 10/2004 | Girgensohn et al. | |
| 6,810,031 B1 | 10/2004 | Hegde et al. | |
| 6,810,389 B1 | 10/2004 | Meyer | |
| 6,819,394 B1 | 11/2004 | Nomura et al. | |
| 6,850,252 B1 | 2/2005 | Hoffberg | |
| 6,856,997 B2 | 2/2005 | Lee et al. | |
| 6,859,496 B1 | 2/2005 | Boroczky et al. | |
| 6,917,652 B2 | 7/2005 | Lyu | |
| 6,931,531 B1 | 8/2005 | Takahashi | |
| 6,944,621 B1 | 9/2005 | Collart | |
| 6,944,629 B1 | 9/2005 | Shioi et al. | |
| 6,956,901 B2 | 10/2005 | Boroczky et al. | |
| 6,965,724 B1 | 11/2005 | Boccon-Gibod et al. | |
| 6,965,993 B2 | 11/2005 | Baker | |
| 6,985,588 B1 | 1/2006 | Glick et al. | |
| 6,988,144 B1 | 1/2006 | Luken et al. | |
| 7,007,170 B2 | 2/2006 | Morten | |
| 7,023,924 B1 | 4/2006 | Keller et al. | |
| 7,043,473 B1 | 5/2006 | Rassool et al. | |
| 7,103,906 B1 | 9/2006 | Katz et al. | |
| 7,127,155 B2 | 10/2006 | Ando et al. | |
| 7,150,045 B2 | 12/2006 | Koelle et al. | |
| 7,151,832 B1 | 12/2006 | Fetkovich et al. | |
| 7,151,833 B2 | 12/2006 | Candelore et al. | |
| 7,165,175 B1 | 1/2007 | Kollmyer et al. | |
| 7,185,363 B1 | 2/2007 | Narin et al. | |
| 7,197,234 B1 | 3/2007 | Chatterton | |
| 7,206,940 B2 | 4/2007 | Evans et al. | |
| 7,209,892 B1 | 4/2007 | Galuten et al. | |
| 7,231,132 B1 | 6/2007 | Davenport | |
| 7,237,061 B1 | 6/2007 | Boic | |
| 7,242,772 B1 | 7/2007 | Tehranchi | |
| 7,243,346 B1 | 7/2007 | Seth et al. | |
| 7,295,673 B2 | 11/2007 | Grab et al. | |
| 7,328,345 B2 | 2/2008 | Morten et al. | |
| 7,330,875 B1 | 2/2008 | Parasnis et al. | |
| 7,340,528 B2 | 3/2008 | Noblecourt et al. | |
| 7,349,886 B2 | 3/2008 | Morten et al. | |
| 7,356,143 B2 | 4/2008 | Morten | |
| 7,356,245 B2 | 4/2008 | Belknap et al. | |
| 7,366,788 B2 | 4/2008 | Jones et al. | |
| 7,376,831 B2 | 5/2008 | Kollmyer et al. | |
| 7,406,174 B2 | 7/2008 | Palmer | |
| 7,421,411 B2 | 9/2008 | Kontio et al. | |
| 7,454,780 B2 | 11/2008 | Katsube et al. | |
| 7,457,359 B2 | 11/2008 | Mabey et al. | |
| 7,472,280 B2 | 12/2008 | Giobbi | |
| 7,478,325 B2 | 1/2009 | Foehr | |
| 7,484,103 B2 | 1/2009 | Woo et al. | |

(56) References Cited

U.S. PATENT DOCUMENTS

| | | |
|---|---|---|
| 7,493,018 B2 | 2/2009 | Kim |
| 7,499,938 B2 | 3/2009 | Collart |
| 7,515,710 B2 | 4/2009 | Russell et al. |
| 7,526,450 B2 | 4/2009 | Hughes et al. |
| 7,594,271 B2 | 9/2009 | Zhuk et al. |
| 7,610,365 B1 | 10/2009 | Kraft et al. |
| 7,640,435 B2 | 12/2009 | Morten |
| 7,689,510 B2 | 3/2010 | Lamkin et al. |
| 7,720,352 B2 | 5/2010 | Belknap et al. |
| 7,747,853 B2 | 6/2010 | Candelore et al. |
| 7,761,892 B2 | 7/2010 | Ellis et al. |
| 7,779,097 B2 | 8/2010 | Lamkin et al. |
| 7,788,271 B2 | 8/2010 | Soma et al. |
| 7,817,608 B2 | 10/2010 | Rassool et al. |
| 7,869,691 B2 | 1/2011 | Kelly et al. |
| 7,882,034 B2 | 2/2011 | Hug et al. |
| 7,949,703 B2 | 5/2011 | Matsuzaki et al. |
| 7,962,942 B1 | 6/2011 | Craner |
| 7,974,714 B2 | 7/2011 | Hoffberg |
| 7,991,156 B1 | 8/2011 | Miller |
| 8,023,562 B2 | 9/2011 | Zheludkov et al. |
| 8,046,453 B2 | 10/2011 | Olaiya |
| 8,054,880 B2 | 11/2011 | Yu et al. |
| 8,065,708 B1 | 11/2011 | Smyth et al. |
| 8,069,260 B2 | 11/2011 | Speicher et al. |
| 8,082,442 B2 | 12/2011 | Keljo et al. |
| 8,195,714 B2 | 6/2012 | McKibben et al. |
| 8,201,264 B2 | 6/2012 | Grab et al. |
| 8,225,061 B2 | 7/2012 | Greenebaum |
| 8,233,768 B2 | 7/2012 | Soroushian et al. |
| 8,245,124 B1 * | 8/2012 | Gupta ............... G11B 27/034 715/202 |
| 8,249,168 B2 | 8/2012 | Graves |
| 8,261,356 B2 | 9/2012 | Choi et al. |
| 8,265,168 B1 | 9/2012 | Masterson et al. |
| 8,270,473 B2 | 9/2012 | Chen et al. |
| 8,270,819 B2 | 9/2012 | Vannier |
| 8,275,871 B2 | 9/2012 | Ram et al. |
| 8,289,338 B2 | 10/2012 | Priyadarshi et al. |
| 8,291,460 B1 | 10/2012 | Peacock |
| 8,296,434 B1 | 10/2012 | Miller et al. |
| 8,311,111 B2 * | 11/2012 | Xu ..................... H04N 19/51 375/240.13 |
| 8,311,115 B2 | 11/2012 | Gu et al. |
| 8,321,556 B1 | 11/2012 | Chatterjee et al. |
| 8,325,800 B2 | 12/2012 | Holcomb et al. |
| 8,341,715 B2 | 12/2012 | Sherkin et al. |
| 8,386,621 B2 | 2/2013 | Park |
| 8,396,114 B2 | 3/2013 | Gu et al. |
| 8,401,900 B2 | 3/2013 | Cansler et al. |
| 8,407,753 B2 | 3/2013 | Kuo |
| 8,412,841 B1 | 4/2013 | Swaminathan et al. |
| 8,423,889 B1 | 4/2013 | Zagorie et al. |
| 8,452,110 B2 | 5/2013 | Shoham et al. |
| 8,456,380 B2 | 6/2013 | Pagan |
| 8,472,792 B2 | 6/2013 | Butt et al. |
| 8,473,630 B1 | 6/2013 | Galligan |
| 8,510,303 B2 | 8/2013 | Soroushian et al. |
| 8,510,404 B2 | 8/2013 | Carmel et al. |
| 8,515,265 B2 | 8/2013 | Kwon et al. |
| 8,516,529 B2 | 8/2013 | Lajoie et al. |
| 8,527,645 B1 | 9/2013 | Proffit et al. |
| 8,595,378 B1 | 11/2013 | Cohn et al. |
| 8,606,069 B2 | 12/2013 | Okubo et al. |
| 8,640,166 B1 | 1/2014 | Craner et al. |
| 8,649,669 B2 | 2/2014 | Braness et al. |
| 8,656,183 B2 | 2/2014 | Russell et al. |
| 8,677,428 B2 | 3/2014 | Lewis et al. |
| 8,681,866 B1 | 3/2014 | Jia |
| 8,689,267 B2 | 4/2014 | Hunt |
| 8,726,264 B1 | 5/2014 | Allen et al. |
| RE45,052 E | 7/2014 | Li |
| 8,767,825 B1 | 7/2014 | Wang et al. |
| 8,774,609 B2 | 7/2014 | Drake et al. |
| 8,781,122 B2 | 7/2014 | Chan et al. |
| 8,805,109 B2 | 8/2014 | Shoham et al. |
| 8,806,188 B2 | 8/2014 | Braness et al. |
| 8,832,434 B2 | 9/2014 | Apostolopoulos et al. |
| 8,843,586 B2 | 9/2014 | Pantos et al. |
| 8,856,218 B1 | 10/2014 | Inskip |
| 8,908,984 B2 | 12/2014 | Shoham et al. |
| 8,909,922 B2 | 12/2014 | Kiefer et al. |
| 8,914,534 B2 | 12/2014 | Braness et al. |
| 8,914,836 B2 | 12/2014 | Shivadas et al. |
| 8,918,535 B2 | 12/2014 | Ma et al. |
| 8,918,636 B2 | 12/2014 | Kiefer |
| 8,918,908 B2 | 12/2014 | Ziskind et al. |
| 8,948,249 B2 | 2/2015 | Sun et al. |
| 8,997,161 B2 | 3/2015 | Priyadarshi et al. |
| 8,997,254 B2 | 3/2015 | Amidei et al. |
| 9,014,471 B2 | 4/2015 | Shoham et al. |
| 9,025,659 B2 | 5/2015 | Soroushian et al. |
| 9,042,670 B2 | 5/2015 | Carmel et al. |
| 9,060,207 B2 | 6/2015 | Scherkus et al. |
| 9,094,737 B2 | 7/2015 | Shivadas et al. |
| 9,098,335 B2 | 8/2015 | Muthiah et al. |
| 9,124,773 B2 | 9/2015 | Chan et al. |
| 9,125,073 B2 | 9/2015 | Oyman et al. |
| 9,184,920 B2 | 11/2015 | Grab et al. |
| 9,191,457 B2 | 11/2015 | Van der Schaar |
| 9,197,685 B2 | 11/2015 | Soroushian |
| 9,203,816 B2 | 12/2015 | Brueck et al. |
| 9,210,481 B2 | 12/2015 | Braness et al. |
| 9,215,466 B2 | 12/2015 | Zhai et al. |
| 9,247,311 B2 | 1/2016 | Kiefer |
| 9,247,312 B2 | 1/2016 | Braness et al. |
| 9,247,317 B2 | 1/2016 | Shivadas et al. |
| 9,253,178 B2 | 2/2016 | Blom et al. |
| 9,264,475 B2 | 2/2016 | Shivadas et al. |
| 9,294,531 B2 | 3/2016 | Zhang et al. |
| 9,313,510 B2 | 4/2016 | Shivadas et al. |
| 9,343,112 B2 | 5/2016 | Amidei et al. |
| 9,344,517 B2 | 5/2016 | Shivadas et al. |
| 9,344,721 B2 | 5/2016 | Dikvall |
| 9,479,805 B2 | 10/2016 | Rothschild et al. |
| 9,485,546 B2 | 11/2016 | Chen et al. |
| 9,571,827 B2 | 2/2017 | Su et al. |
| 9,584,557 B2 | 2/2017 | Panje et al. |
| 9,584,847 B2 | 2/2017 | Ma et al. |
| 9,621,522 B2 | 4/2017 | Kiefer et al. |
| 9,706,259 B2 | 7/2017 | Chan et al. |
| 9,712,890 B2 | 7/2017 | Shivadas et al. |
| 9,798,863 B2 | 10/2017 | Grab et al. |
| 9,813,740 B2 | 11/2017 | Panje et al. |
| 9,866,878 B2 | 1/2018 | van der Schaar et al. |
| 9,883,204 B2 | 1/2018 | Braness et al. |
| 9,906,785 B2 | 2/2018 | Naletov et al. |
| 9,967,189 B2 | 5/2018 | Patel et al. |
| 9,967,305 B2 | 5/2018 | Braness |
| 10,264,255 B2 | 4/2019 | Naletov et al. |
| 2001/0030710 A1 | 10/2001 | Werner |
| 2001/0036355 A1 | 11/2001 | Kelly et al. |
| 2001/0046299 A1 | 11/2001 | Wasilewski et al. |
| 2001/0053222 A1 | 12/2001 | Wakao et al. |
| 2002/0026560 A1 | 2/2002 | Jordan et al. |
| 2002/0034252 A1 | 3/2002 | Owen et al. |
| 2002/0051494 A1 | 5/2002 | Yamaguchi et al. |
| 2002/0057898 A1 | 5/2002 | Normile |
| 2002/0062313 A1 | 5/2002 | Lee et al. |
| 2002/0076112 A1 | 6/2002 | Devara |
| 2002/0087569 A1 | 7/2002 | Fischer et al. |
| 2002/0091665 A1 | 7/2002 | Beek et al. |
| 2002/0093571 A1 | 7/2002 | Hyodo |
| 2002/0110193 A1 | 8/2002 | Yoo et al. |
| 2002/0116481 A1 | 8/2002 | Lee |
| 2002/0118953 A1 | 8/2002 | Kim |
| 2002/0120934 A1 | 8/2002 | Abrahams et al. |
| 2002/0136298 A1 | 9/2002 | Anantharamu et al. |
| 2002/0143413 A1 | 10/2002 | Fay et al. |
| 2002/0143547 A1 | 10/2002 | Fay et al. |
| 2002/0147980 A1 | 10/2002 | Satoda |
| 2002/0159528 A1 * | 10/2002 | Graziani ............... H04N 19/40 375/240.16 |
| 2002/0159598 A1 | 10/2002 | Rubinstein et al. |

(56) References Cited

U.S. PATENT DOCUMENTS

| | | |
|---|---|---|
| 2002/0161462 A1 | 10/2002 | Fay |
| 2002/0180929 A1 | 12/2002 | Tseng et al. |
| 2002/0184159 A1 | 12/2002 | Tadayon et al. |
| 2002/0184515 A1 | 12/2002 | Oho et al. |
| 2002/0191112 A1 | 12/2002 | Akiyoshi et al. |
| 2002/0191959 A1 | 12/2002 | Lin et al. |
| 2002/0191960 A1 | 12/2002 | Fujinami et al. |
| 2003/0001964 A1 | 1/2003 | Masukura et al. |
| 2003/0002578 A1 | 1/2003 | Tsukagoshi et al. |
| 2003/0005442 A1 | 1/2003 | Brodersen et al. |
| 2003/0021296 A1 | 1/2003 | Wee et al. |
| 2003/0031178 A1 | 2/2003 | Haeri |
| 2003/0035488 A1 | 2/2003 | Barrau |
| 2003/0035545 A1 | 2/2003 | Jiang |
| 2003/0035546 A1 | 2/2003 | Jiang et al. |
| 2003/0041257 A1 | 2/2003 | Wee et al. |
| 2003/0061305 A1 | 3/2003 | Copley et al. |
| 2003/0061369 A1 | 3/2003 | Aksu et al. |
| 2003/0065777 A1 | 4/2003 | Mattila et al. |
| 2003/0078930 A1 | 4/2003 | Surcouf et al. |
| 2003/0093799 A1 | 5/2003 | Kauffman et al. |
| 2003/0123855 A1 | 7/2003 | Okada et al. |
| 2003/0128296 A1 | 7/2003 | Lee |
| 2003/0133506 A1 | 7/2003 | Haneda |
| 2003/0152370 A1 | 8/2003 | Otomo et al. |
| 2003/0163824 A1 | 8/2003 | Gordon et al. |
| 2003/0165328 A1 | 9/2003 | Grecia |
| 2003/0174844 A1 | 9/2003 | Candelore |
| 2003/0185302 A1 | 10/2003 | Abrams |
| 2003/0185542 A1 | 10/2003 | McVeigh et al. |
| 2003/0206558 A1 | 11/2003 | Parkkinen et al. |
| 2003/0210821 A1* | 11/2003 | Yogeshwar ............ H04N 19/46 382/232 |
| 2003/0216922 A1 | 11/2003 | Gonzales et al. |
| 2003/0229900 A1 | 12/2003 | Reisman |
| 2003/0231863 A1 | 12/2003 | Eerenberg et al. |
| 2003/0231867 A1 | 12/2003 | Gates et al. |
| 2003/0233464 A1 | 12/2003 | Walpole et al. |
| 2003/0236836 A1 | 12/2003 | Borthwick |
| 2003/0236907 A1 | 12/2003 | Stewart et al. |
| 2004/0006701 A1 | 1/2004 | Kresina |
| 2004/0021684 A1 | 2/2004 | Millner |
| 2004/0024688 A1 | 2/2004 | Bi et al. |
| 2004/0025180 A1 | 2/2004 | Begeja et al. |
| 2004/0031058 A1 | 2/2004 | Reisman |
| 2004/0039916 A1 | 2/2004 | Aldis et al. |
| 2004/0047614 A1 | 3/2004 | Green |
| 2004/0052501 A1 | 3/2004 | Tam |
| 2004/0071453 A1 | 4/2004 | Valderas |
| 2004/0081333 A1 | 4/2004 | Grab et al. |
| 2004/0081434 A1 | 4/2004 | Jung et al. |
| 2004/0093618 A1 | 5/2004 | Baldwin et al. |
| 2004/0105549 A1 | 6/2004 | Suzuki et al. |
| 2004/0114687 A1 | 6/2004 | Ferris et al. |
| 2004/0117347 A1 | 6/2004 | Seo et al. |
| 2004/0136698 A1 | 7/2004 | Mock |
| 2004/0139335 A1 | 7/2004 | Diamand et al. |
| 2004/0143760 A1 | 7/2004 | Alkove et al. |
| 2004/0146276 A1 | 7/2004 | Ogawa |
| 2004/0158878 A1 | 8/2004 | Ratnakar et al. |
| 2004/0184534 A1 | 9/2004 | Wang |
| 2004/0184616 A1 | 9/2004 | Morten et al. |
| 2004/0202320 A1 | 10/2004 | Amini et al. |
| 2004/0217971 A1 | 11/2004 | Kim |
| 2004/0255115 A1 | 12/2004 | DeMello et al. |
| 2004/0255236 A1 | 12/2004 | Collart |
| 2005/0004875 A1 | 1/2005 | Kontio et al. |
| 2005/0005025 A1 | 1/2005 | Harville et al. |
| 2005/0015797 A1 | 1/2005 | Noblecourt et al. |
| 2005/0038826 A1 | 2/2005 | Bae et al. |
| 2005/0055399 A1 | 3/2005 | Savchuk |
| 2005/0071280 A1 | 3/2005 | Irwin et al. |
| 2005/0108320 A1 | 5/2005 | Lord et al. |
| 2005/0114534 A1 | 5/2005 | Lee |
| 2005/0114896 A1 | 5/2005 | Hug |
| 2005/0149450 A1 | 7/2005 | Stefik et al. |
| 2005/0180641 A1 | 8/2005 | Clark |
| 2005/0183120 A1 | 8/2005 | Jain et al. |
| 2005/0193070 A1 | 9/2005 | Brown et al. |
| 2005/0193322 A1 | 9/2005 | Lamkin et al. |
| 2005/0196147 A1 | 9/2005 | Seo et al. |
| 2005/0204289 A1 | 9/2005 | Mohammed et al. |
| 2005/0207442 A1 | 9/2005 | Zoest et al. |
| 2005/0207578 A1 | 9/2005 | Matsuyama et al. |
| 2005/0254508 A1 | 11/2005 | Aksu et al. |
| 2005/0273695 A1 | 12/2005 | Schnurr |
| 2005/0275656 A1 | 12/2005 | Corbin et al. |
| 2006/0015580 A1 | 1/2006 | Gabriel et al. |
| 2006/0026294 A1 | 2/2006 | Virdi et al. |
| 2006/0026302 A1 | 2/2006 | Bennett et al. |
| 2006/0036549 A1 | 2/2006 | Wu |
| 2006/0037057 A1 | 2/2006 | Xu |
| 2006/0052095 A1 | 3/2006 | Vazvan |
| 2006/0053080 A1 | 3/2006 | Edmonson et al. |
| 2006/0064605 A1 | 3/2006 | Giobbi |
| 2006/0078301 A1 | 4/2006 | Ikeda et al. |
| 2006/0093320 A1 | 5/2006 | Hallberg et al. |
| 2006/0120378 A1 | 6/2006 | Usuki et al. |
| 2006/0129909 A1 | 6/2006 | Butt et al. |
| 2006/0168639 A1 | 7/2006 | Gan et al. |
| 2006/0173887 A1 | 8/2006 | Breitfeld et al. |
| 2006/0179239 A1 | 8/2006 | Fluhr |
| 2006/0181965 A1 | 8/2006 | Collart |
| 2006/0235880 A1 | 10/2006 | Qian |
| 2006/0245727 A1 | 11/2006 | Nakano et al. |
| 2006/0259588 A1 | 11/2006 | Lerman et al. |
| 2006/0263056 A1 | 11/2006 | Lin et al. |
| 2006/0267986 A1 | 11/2006 | Bae |
| 2006/0274835 A1 | 12/2006 | Hamilton et al. |
| 2006/0294164 A1 | 12/2006 | Armangau et al. |
| 2007/0005333 A1 | 1/2007 | Setiohardjo et al. |
| 2007/0031110 A1 | 2/2007 | Rijckaert |
| 2007/0033419 A1 | 2/2007 | Kocher et al. |
| 2007/0044010 A1 | 2/2007 | Sull et al. |
| 2007/0047901 A1 | 3/2007 | Ando et al. |
| 2007/0053513 A1 | 3/2007 | Hoffberg |
| 2007/0058928 A1 | 3/2007 | Naito et al. |
| 2007/0083617 A1 | 4/2007 | Chakrabarti et al. |
| 2007/0086528 A1 | 4/2007 | Mauchly et al. |
| 2007/0100757 A1 | 5/2007 | Rhoads |
| 2007/0133603 A1 | 6/2007 | Weaver |
| 2007/0136817 A1 | 6/2007 | Nguyen |
| 2007/0140647 A1 | 6/2007 | Kusunoki et al. |
| 2007/0154165 A1 | 7/2007 | Hemmeryckz-Deleersnijder et al. |
| 2007/0168541 A1 | 7/2007 | Gupta et al. |
| 2007/0168542 A1 | 7/2007 | Gupta et al. |
| 2007/0178933 A1 | 8/2007 | Nelson |
| 2007/0180125 A1 | 8/2007 | Knowles et al. |
| 2007/0185982 A1 | 8/2007 | Nakanowatari et al. |
| 2007/0192810 A1 | 8/2007 | Pritchett et al. |
| 2007/0217339 A1 | 9/2007 | Zhao |
| 2007/0217759 A1 | 9/2007 | Dodd |
| 2007/0234391 A1 | 10/2007 | Hunter et al. |
| 2007/0239839 A1 | 10/2007 | Buday et al. |
| 2007/0255940 A1 | 11/2007 | Ueno |
| 2007/0271317 A1 | 11/2007 | Carmel et al. |
| 2007/0271385 A1 | 11/2007 | Davis et al. |
| 2007/0274679 A1 | 11/2007 | Yahata et al. |
| 2007/0277219 A1 | 11/2007 | Toebes et al. |
| 2007/0277234 A1 | 11/2007 | Bessonov et al. |
| 2007/0280298 A1 | 12/2007 | Hearn et al. |
| 2007/0288745 A1 | 12/2007 | Kwan |
| 2007/0292107 A1 | 12/2007 | Yahata et al. |
| 2007/0297422 A1 | 12/2007 | Matsuo et al. |
| 2008/0005175 A1 | 1/2008 | Bourke et al. |
| 2008/0008455 A1 | 1/2008 | De Lange et al. |
| 2008/0043832 A1 | 2/2008 | Barkley et al. |
| 2008/0046718 A1 | 2/2008 | Grab et al. |
| 2008/0066099 A1 | 3/2008 | Brodersen et al. |
| 2008/0066181 A1 | 3/2008 | Haveson et al. |
| 2008/0077592 A1 | 3/2008 | Brodie et al. |
| 2008/0086456 A1 | 4/2008 | Rasanen et al. |
| 2008/0086747 A1 | 4/2008 | Rasanen et al. |
| 2008/0101466 A1 | 5/2008 | Swenson et al. |

(56) References Cited

U.S. PATENT DOCUMENTS

| | | |
|---|---|---|
| 2008/0104633 A1 | 5/2008 | Noblecourt et al. |
| 2008/0120330 A1 | 5/2008 | Reed et al. |
| 2008/0120342 A1 | 5/2008 | Reed et al. |
| 2008/0120389 A1 | 5/2008 | Bassali et al. |
| 2008/0126248 A1 | 5/2008 | Lee et al. |
| 2008/0131078 A1 | 6/2008 | Jeong et al. |
| 2008/0137541 A1 | 6/2008 | Agarwal et al. |
| 2008/0137736 A1 | 6/2008 | Richardson et al. |
| 2008/0151817 A1 | 6/2008 | Fitchett |
| 2008/0172441 A1 | 7/2008 | Speicher et al. |
| 2008/0187283 A1 | 8/2008 | Takahashi |
| 2008/0192818 A1 | 8/2008 | DiPietro et al. |
| 2008/0195664 A1 | 8/2008 | Maharajh et al. |
| 2008/0195744 A1 | 8/2008 | Bowra et al. |
| 2008/0201705 A1 | 8/2008 | Wookey |
| 2008/0205860 A1 | 8/2008 | Holtman |
| 2008/0209534 A1 | 8/2008 | Keronen et al. |
| 2008/0240144 A1 | 10/2008 | Kruse et al. |
| 2008/0256105 A1 | 10/2008 | Nogawa et al. |
| 2008/0263354 A1 | 10/2008 | Beuque et al. |
| 2008/0271102 A1 | 10/2008 | Kienzle et al. |
| 2008/0279535 A1 | 11/2008 | Haque et al. |
| 2008/0294453 A1* | 11/2008 | Baird-Smith ............ G06F 21/10 705/1.1 |
| 2008/0298358 A1 | 12/2008 | John et al. |
| 2008/0310454 A1 | 12/2008 | Bellwood et al. |
| 2008/0310496 A1 | 12/2008 | Fang |
| 2009/0031220 A1 | 1/2009 | Tranchant et al. |
| 2009/0037959 A1 | 2/2009 | Suh et al. |
| 2009/0048852 A1 | 2/2009 | Burns et al. |
| 2009/0055546 A1 | 2/2009 | Jung et al. |
| 2009/0060452 A1 | 3/2009 | Chaudhri |
| 2009/0064341 A1 | 3/2009 | Hartung et al. |
| 2009/0066839 A1 | 3/2009 | Jung et al. |
| 2009/0097644 A1 | 4/2009 | Haruki |
| 2009/0132599 A1 | 5/2009 | Soroushian et al. |
| 2009/0132721 A1 | 5/2009 | Soroushian et al. |
| 2009/0132824 A1 | 5/2009 | Terada et al. |
| 2009/0136216 A1 | 5/2009 | Soroushian et al. |
| 2009/0150557 A1 | 6/2009 | Wormley et al. |
| 2009/0165148 A1 | 6/2009 | Frey et al. |
| 2009/0168795 A1 | 7/2009 | Segel et al. |
| 2009/0169181 A1 | 7/2009 | Priyadarshi et al. |
| 2009/0172201 A1 | 7/2009 | Carmel et al. |
| 2009/0178090 A1 | 7/2009 | Oztaskent |
| 2009/0196139 A1 | 8/2009 | Bates et al. |
| 2009/0201988 A1 | 8/2009 | Gazier et al. |
| 2009/0217317 A1 | 8/2009 | White et al. |
| 2009/0226148 A1 | 9/2009 | Nesvadba et al. |
| 2009/0228395 A1 | 9/2009 | Wegner et al. |
| 2009/0265737 A1 | 10/2009 | Issa et al. |
| 2009/0276636 A1 | 11/2009 | Grab et al. |
| 2009/0290706 A1 | 11/2009 | Amini et al. |
| 2009/0290708 A1 | 11/2009 | Schneider et al. |
| 2009/0293116 A1 | 11/2009 | DeMello |
| 2009/0303241 A1 | 12/2009 | Priyadarshi et al. |
| 2009/0307258 A1 | 12/2009 | Priyadarshi et al. |
| 2009/0307267 A1 | 12/2009 | Chen et al. |
| 2009/0310933 A1 | 12/2009 | Lee |
| 2009/0313544 A1 | 12/2009 | Wood et al. |
| 2009/0313564 A1 | 12/2009 | Rottler et al. |
| 2009/0316783 A1 | 12/2009 | Au et al. |
| 2009/0328124 A1 | 12/2009 | Khouzam et al. |
| 2009/0328228 A1 | 12/2009 | Schnell |
| 2010/0040351 A1 | 2/2010 | Toma et al. |
| 2010/0057928 A1 | 3/2010 | Kapoor et al. |
| 2010/0058405 A1 | 3/2010 | Ramakrishnan et al. |
| 2010/0074324 A1 | 3/2010 | Qian et al. |
| 2010/0074333 A1* | 3/2010 | Au ......................... H04N 19/51 375/240.12 |
| 2010/0083322 A1 | 4/2010 | Rouse |
| 2010/0094969 A1 | 4/2010 | Zuckerman et al. |
| 2010/0095121 A1 | 4/2010 | Shetty et al. |
| 2010/0106968 A1 | 4/2010 | Mori et al. |
| 2010/0107260 A1 | 4/2010 | Orrell et al. |
| 2010/0111192 A1 | 5/2010 | Graves |
| 2010/0138903 A1 | 6/2010 | Medvinsky |
| 2010/0142917 A1 | 6/2010 | Isaji |
| 2010/0158109 A1 | 6/2010 | Dahlby et al. |
| 2010/0161825 A1 | 6/2010 | Ronca et al. |
| 2010/0166060 A1* | 7/2010 | Ezure ................... H04N 19/176 375/240.03 |
| 2010/0186092 A1 | 7/2010 | Takechi et al. |
| 2010/0189183 A1 | 7/2010 | Gu et al. |
| 2010/0218208 A1 | 8/2010 | Holden |
| 2010/0228795 A1 | 9/2010 | Hahn |
| 2010/0235472 A1 | 9/2010 | Sood et al. |
| 2010/0250532 A1 | 9/2010 | Soroushian et al. |
| 2010/0290761 A1 | 11/2010 | Drake et al. |
| 2010/0299522 A1 | 11/2010 | Khambete et al. |
| 2010/0306249 A1 | 12/2010 | Hill et al. |
| 2010/0313225 A1 | 12/2010 | Cholas et al. |
| 2010/0313226 A1 | 12/2010 | Cholas et al. |
| 2010/0316126 A1 | 12/2010 | Chen et al. |
| 2010/0319014 A1 | 12/2010 | Lockett et al. |
| 2010/0319017 A1 | 12/2010 | Cook |
| 2010/0332595 A1 | 12/2010 | Fullagar et al. |
| 2011/0002381 A1* | 1/2011 | Yang ................... H04N 19/172 375/240.03 |
| 2011/0016225 A1 | 1/2011 | Park et al. |
| 2011/0047209 A1 | 2/2011 | Lindholm et al. |
| 2011/0055585 A1 | 3/2011 | Lee |
| 2011/0060808 A1 | 3/2011 | Martin et al. |
| 2011/0066673 A1 | 3/2011 | Outlaw |
| 2011/0067057 A1 | 3/2011 | Karaoguz et al. |
| 2011/0078440 A1 | 3/2011 | Feng et al. |
| 2011/0080940 A1 | 4/2011 | Bocharov |
| 2011/0082924 A1 | 4/2011 | Gopalakrishnan |
| 2011/0096828 A1 | 4/2011 | Chen et al. |
| 2011/0107379 A1 | 5/2011 | Lajoie et al. |
| 2011/0116772 A1 | 5/2011 | Kwon et al. |
| 2011/0126191 A1 | 5/2011 | Hughes et al. |
| 2011/0129011 A1 | 6/2011 | Cilli et al. |
| 2011/0135090 A1 | 6/2011 | Chan et al. |
| 2011/0138018 A1 | 6/2011 | Raveendran et al. |
| 2011/0142415 A1 | 6/2011 | Rhyu |
| 2011/0145726 A1 | 6/2011 | Wei et al. |
| 2011/0149753 A1 | 6/2011 | Bapst et al. |
| 2011/0150100 A1 | 6/2011 | Abadir |
| 2011/0153785 A1 | 6/2011 | Minborg et al. |
| 2011/0153835 A1 | 6/2011 | Rimac et al. |
| 2011/0184738 A1 | 7/2011 | Kalisky et al. |
| 2011/0191439 A1 | 8/2011 | Dazzi et al. |
| 2011/0191803 A1 | 8/2011 | Baldwin et al. |
| 2011/0197237 A1 | 8/2011 | Turner |
| 2011/0197267 A1 | 8/2011 | Gravel et al. |
| 2011/0213827 A1 | 9/2011 | Kaspar et al. |
| 2011/0222786 A1 | 9/2011 | Carmel et al. |
| 2011/0225302 A1 | 9/2011 | Park et al. |
| 2011/0225315 A1 | 9/2011 | Wexler et al. |
| 2011/0225417 A1 | 9/2011 | Maharajh et al. |
| 2011/0239078 A1 | 9/2011 | Luby et al. |
| 2011/0246657 A1 | 10/2011 | Glow |
| 2011/0246659 A1 | 10/2011 | Bouazizi |
| 2011/0252118 A1 | 10/2011 | Pantos et al. |
| 2011/0264530 A1 | 10/2011 | Santangelo et al. |
| 2011/0268178 A1 | 11/2011 | Park et al. |
| 2011/0276695 A1 | 11/2011 | Maldaner et al. |
| 2011/0283012 A1 | 11/2011 | Melnyk |
| 2011/0291723 A1 | 12/2011 | Hashimoto |
| 2011/0302319 A1 | 12/2011 | Ha et al. |
| 2011/0305273 A1 | 12/2011 | He et al. |
| 2011/0314176 A1 | 12/2011 | Frojdh et al. |
| 2011/0314500 A1 | 12/2011 | Gordon |
| 2012/0005368 A1 | 1/2012 | Knittle et al. |
| 2012/0017282 A1 | 1/2012 | Kang et al. |
| 2012/0023251 A1 | 1/2012 | Pyle et al. |
| 2012/0036365 A1 | 2/2012 | Kyslov et al. |
| 2012/0036544 A1 | 2/2012 | Chen et al. |
| 2012/0066360 A1 | 3/2012 | Ghosh |
| 2012/0093214 A1 | 4/2012 | Urbach |
| 2012/0114302 A1* | 5/2012 | Randall ................ G11B 27/105 386/241 |
| 2012/0124191 A1 | 5/2012 | Lyon |

(56) References Cited

U.S. PATENT DOCUMENTS

| | | |
|---|---|---|
| 2012/0137336 A1 | 5/2012 | Applegate et al. |
| 2012/0144117 A1 | 6/2012 | Weare et al. |
| 2012/0144445 A1 | 6/2012 | Bonta et al. |
| 2012/0147958 A1 | 6/2012 | Ronca et al. |
| 2012/0166633 A1 | 6/2012 | Baumback et al. |
| 2012/0170642 A1 | 7/2012 | Braness et al. |
| 2012/0170643 A1 | 7/2012 | Soroushian et al. |
| 2012/0170906 A1 | 7/2012 | Soroushian et al. |
| 2012/0170915 A1 | 7/2012 | Braness et al. |
| 2012/0173751 A1 | 7/2012 | Braness et al. |
| 2012/0177101 A1 | 7/2012 | van der Schaar |
| 2012/0179834 A1 | 7/2012 | van der Schaar et al. |
| 2012/0201475 A1 | 8/2012 | Carmel et al. |
| 2012/0201476 A1 | 8/2012 | Carmel et al. |
| 2012/0233345 A1 | 9/2012 | Hannuksela |
| 2012/0240176 A1 | 9/2012 | Ma et al. |
| 2012/0254455 A1 | 10/2012 | Adimatyam et al. |
| 2012/0257678 A1* | 10/2012 | Zhou ............... H04N 19/52 375/240.16 |
| 2012/0260277 A1 | 10/2012 | Kosciewicz |
| 2012/0263434 A1 | 10/2012 | Wainner et al. |
| 2012/0265562 A1 | 10/2012 | Daouk et al. |
| 2012/0278496 A1 | 11/2012 | Hsu |
| 2012/0289147 A1 | 11/2012 | Raleigh et al. |
| 2012/0294355 A1 | 11/2012 | Holcomb et al. |
| 2012/0297039 A1 | 11/2012 | Acuna et al. |
| 2012/0307883 A1 | 12/2012 | Graves |
| 2012/0311094 A1 | 12/2012 | Biderman et al. |
| 2012/0314778 A1 | 12/2012 | Salustri et al. |
| 2012/0317235 A1 | 12/2012 | Nguyen et al. |
| 2013/0007223 A1 | 1/2013 | Luby et al. |
| 2013/0013730 A1 | 1/2013 | Li et al. |
| 2013/0019107 A1 | 1/2013 | Grab et al. |
| 2013/0019273 A1 | 1/2013 | Ma et al. |
| 2013/0041808 A1 | 2/2013 | Pham et al. |
| 2013/0044821 A1 | 2/2013 | Braness et al. |
| 2013/0046849 A1 | 2/2013 | Wolf |
| 2013/0046902 A1 | 2/2013 | Villegas Nuñez et al. |
| 2013/0051554 A1 | 2/2013 | Braness et al. |
| 2013/0054958 A1 | 2/2013 | Braness et al. |
| 2013/0055084 A1 | 2/2013 | Soroushian et al. |
| 2013/0058480 A1 | 3/2013 | Ziskind et al. |
| 2013/0061040 A1 | 3/2013 | Kiefer et al. |
| 2013/0061045 A1 | 3/2013 | Kiefer et al. |
| 2013/0064466 A1 | 3/2013 | Carmel et al. |
| 2013/0066838 A1 | 3/2013 | Singla et al. |
| 2013/0094565 A1 | 4/2013 | Yang et al. |
| 2013/0097309 A1 | 4/2013 | Ma et al. |
| 2013/0114944 A1 | 5/2013 | Soroushian et al. |
| 2013/0124859 A1 | 5/2013 | Pestoni et al. |
| 2013/0128962 A1 | 5/2013 | Rajagopalan et al. |
| 2013/0152767 A1 | 6/2013 | Katz et al. |
| 2013/0166580 A1 | 6/2013 | Maharajh |
| 2013/0166765 A1 | 6/2013 | Kaufman |
| 2013/0166906 A1 | 6/2013 | Swaminathan et al. |
| 2013/0170561 A1 | 7/2013 | Hannuksela |
| 2013/0170764 A1 | 7/2013 | Carmel et al. |
| 2013/0173513 A1 | 7/2013 | Chu et al. |
| 2013/0179199 A1 | 7/2013 | Ziskind et al. |
| 2013/0179589 A1 | 7/2013 | Mccarthy et al. |
| 2013/0179992 A1 | 7/2013 | Ziskind et al. |
| 2013/0182952 A1 | 7/2013 | Carmel et al. |
| 2013/0196292 A1 | 8/2013 | Brennen et al. |
| 2013/0212228 A1 | 8/2013 | Butler et al. |
| 2013/0223812 A1 | 8/2013 | Rossi |
| 2013/0226578 A1 | 8/2013 | Bolton et al. |
| 2013/0226635 A1 | 8/2013 | Fisher |
| 2013/0227081 A1 | 8/2013 | Luby et al. |
| 2013/0227122 A1 | 8/2013 | Gao |
| 2013/0301424 A1 | 11/2013 | Kotecha et al. |
| 2013/0311670 A1 | 11/2013 | Tarbox et al. |
| 2013/0329781 A1 | 12/2013 | Su et al. |
| 2014/0003516 A1 | 1/2014 | Soroushian |
| 2014/0019593 A1 | 1/2014 | Reznik et al. |
| 2014/0037620 A1 | 2/2014 | Ferree et al. |
| 2014/0052823 A1 | 2/2014 | Gavade et al. |
| 2014/0059156 A1 | 2/2014 | Freeman, II et al. |
| 2014/0096171 A1 | 4/2014 | Shivadas et al. |
| 2014/0101722 A1 | 4/2014 | Moore |
| 2014/0115650 A1 | 4/2014 | Zhang et al. |
| 2014/0119432 A1 | 5/2014 | Wang et al. |
| 2014/0140396 A1 | 5/2014 | Wang et al. |
| 2014/0140417 A1 | 5/2014 | Shaffer et al. |
| 2014/0143301 A1 | 5/2014 | Watson et al. |
| 2014/0143431 A1 | 5/2014 | Watson et al. |
| 2014/0143440 A1 | 5/2014 | Ramamurthy et al. |
| 2014/0177734 A1 | 6/2014 | Carmel et al. |
| 2014/0189065 A1 | 7/2014 | van der Schaar et al. |
| 2014/0201382 A1 | 7/2014 | Shivadas et al. |
| 2014/0211840 A1 | 7/2014 | Butt et al. |
| 2014/0211859 A1 | 7/2014 | Carmel et al. |
| 2014/0241420 A1 | 8/2014 | Orton-Jay et al. |
| 2014/0241421 A1 | 8/2014 | Orton-Jay et al. |
| 2014/0247869 A1 | 9/2014 | Su et al. |
| 2014/0250473 A1 | 9/2014 | Braness et al. |
| 2014/0258714 A1 | 9/2014 | Grab |
| 2014/0269927 A1 | 9/2014 | Naletov et al. |
| 2014/0269936 A1 | 9/2014 | Shivadas et al. |
| 2014/0280763 A1 | 9/2014 | Grab et al. |
| 2014/0297804 A1 | 10/2014 | Shivadas et al. |
| 2014/0297881 A1 | 10/2014 | Shivadas et al. |
| 2014/0355668 A1 | 12/2014 | Shoham et al. |
| 2014/0359678 A1 | 12/2014 | Shivadas et al. |
| 2014/0359679 A1 | 12/2014 | Shivadas et al. |
| 2014/0359680 A1 | 12/2014 | Shivadas et al. |
| 2014/0376720 A1 | 12/2014 | Chan et al. |
| 2015/0006662 A1 | 1/2015 | Braness |
| 2015/0026677 A1 | 1/2015 | Stevens et al. |
| 2015/0049957 A1 | 2/2015 | Shoham et al. |
| 2015/0063693 A1 | 3/2015 | Carmel et al. |
| 2015/0067715 A1 | 3/2015 | Koat et al. |
| 2015/0104153 A1 | 4/2015 | Braness et al. |
| 2015/0117836 A1 | 4/2015 | Amidei et al. |
| 2015/0117837 A1 | 4/2015 | Amidei et al. |
| 2015/0139419 A1 | 5/2015 | Kiefer et al. |
| 2015/0188758 A1 | 7/2015 | Amidei et al. |
| 2015/0188842 A1 | 7/2015 | Amidei et al. |
| 2015/0188921 A1 | 7/2015 | Amidei et al. |
| 2015/0189017 A1 | 7/2015 | Amidei et al. |
| 2015/0189373 A1 | 7/2015 | Amidei et al. |
| 2015/0288996 A1 | 10/2015 | Van Der Schaar et al. |
| 2015/0334435 A1 | 11/2015 | Shivadas et al. |
| 2015/0373421 A1 | 12/2015 | Chan et al. |
| 2016/0070890 A1 | 3/2016 | Grab et al. |
| 2016/0112382 A1 | 4/2016 | Kiefer et al. |
| 2016/0149981 A1 | 5/2016 | Shivadas et al. |
| 2016/0219303 A1 | 7/2016 | Braness et al. |
| 2017/0214947 A1 | 7/2017 | Kiefer et al. |
| 2017/0280203 A1 | 9/2017 | Chan et al. |
| 2018/0007451 A1 | 1/2018 | Shivadas et al. |
| 2018/0060543 A1 | 3/2018 | Grab et al. |
| 2018/0131980 A1 | 5/2018 | Van Der Schaar et al. |
| 2018/0220153 A1 | 8/2018 | Braness et al. |
| 2018/0262757 A1 | 9/2018 | Naletov et al. |
| 2018/0332094 A1 | 11/2018 | Braness |
| 2019/0045219 A1 | 2/2019 | Braness et al. |
| 2019/0045220 A1 | 2/2019 | Braness et al. |

FOREIGN PATENT DOCUMENTS

| | | |
|---|---|---|
| CN | 1169229 | 12/1997 |
| CN | 1221284 A | 6/1999 |
| CN | 1723696 | 1/2006 |
| EP | 757484 A2 | 2/1997 |
| EP | 813167 A2 | 12/1997 |
| EP | 0936812 A1 | 8/1999 |
| EP | 0818111 B1 | 1/2000 |
| EP | 1056273 A2 | 11/2000 |
| EP | 1187483 A2 | 3/2002 |
| EP | 1420580 A1 | 5/2004 |
| EP | 1553779 A1 | 7/2005 |
| EP | 1657835 A1 | 5/2006 |
| EP | 1718074 A1 | 11/2006 |
| EP | 2486517 A1 | 8/2012 |

(56) References Cited

FOREIGN PATENT DOCUMENTS

| | | |
|---|---|---|
| EP | 2486727 A1 | 8/2012 |
| EP | 2507995 A1 | 10/2012 |
| EP | 2564354 A1 | 3/2013 |
| EP | 2616991 | 7/2013 |
| EP | 2617192 | 7/2013 |
| EP | 2661696 A1 | 11/2013 |
| EP | 2661875 A1 | 11/2013 |
| EP | 2661895 A2 | 11/2013 |
| EP | 2486727 A4 | 3/2014 |
| EP | 2564354 A4 | 3/2014 |
| EP | 2616991 A4 | 3/2014 |
| EP | 2617192 A4 | 3/2014 |
| EP | 2716048 A1 | 4/2014 |
| EP | 2721826 A1 | 4/2014 |
| EP | 2486517 | 6/2014 |
| EP | 2751990 | 7/2014 |
| EP | 2807821 | 12/2014 |
| EP | 2751990 A4 | 4/2015 |
| EP | 2661875 B1 | 11/2019 |
| HK | 1125765 A | 8/2009 |
| JP | 08046902 A | 2/1996 |
| JP | 08111842 A | 4/1996 |
| JP | 08163488 A | 6/1996 |
| JP | 08287613 A | 11/1996 |
| JP | 09037225 A | 2/1997 |
| JP | 11164307 A | 6/1999 |
| JP | 11275576 A | 10/1999 |
| JP | 11328929 A | 11/1999 |
| JP | 2000201343 A | 7/2000 |
| JP | 02001043668 A | 2/2001 |
| JP | 2001209726 A | 8/2001 |
| JP | 2001346165 A | 12/2001 |
| JP | 2002164880 A | 6/2002 |
| JP | 2002170363 A | 6/2002 |
| JP | 2002518898 A | 6/2002 |
| JP | 2002218384 A | 8/2002 |
| JP | 2003179597 A | 6/2003 |
| JP | 2003250113 A | 9/2003 |
| JP | 2004013823 A | 1/2004 |
| JP | 2004515941 A | 5/2004 |
| JP | 2004172830 A | 6/2004 |
| JP | 2004187161 A | 7/2004 |
| JP | 2004234128 A | 8/2004 |
| JP | 2004304767 A | 10/2004 |
| JP | 2005027153 | 1/2005 |
| JP | 2005080204 A | 3/2005 |
| JP | 2006155500 A | 6/2006 |
| JP | 2006524007 A | 10/2006 |
| JP | 2007036666 A | 2/2007 |
| JP | 2007174375 A | 7/2007 |
| JP | 2007235690 A | 9/2007 |
| JP | 2007535881 A | 12/2007 |
| JP | 2008235999 A | 10/2008 |
| JP | 2009530917 A | 8/2009 |
| JP | 5200204 B2 | 6/2013 |
| JP | 2014506430 A | 3/2014 |
| JP | 5723888 B2 | 5/2015 |
| JP | 6038805 B2 | 12/2016 |
| JP | 6078574 B2 | 2/2017 |
| JP | 2017063453 | 3/2017 |
| JP | 2018160923 A | 10/2018 |
| JP | 6453291 B2 | 1/2019 |
| KR | 100221423 B1 | 9/1999 |
| KR | 2002013664 | 2/2002 |
| KR | 1020020064888 A | 8/2002 |
| KR | 100669616 B1 | 1/2007 |
| KR | 20100106418 A | 10/2010 |
| KR | 1020130133830 | 12/2013 |
| KR | 101874907 B1 | 7/2018 |
| KR | 101917763 B1 | 11/2018 |
| SG | 146026 | 12/2010 |
| WO | 1995015660 A1 | 6/1995 |
| WO | 1996013121 | 5/1996 |
| WO | 1997031445 A3 | 4/1998 |
| WO | 1999010836 A1 | 3/1999 |
| WO | 1999065239 A2 | 12/1999 |
| WO | 0104892 A1 | 1/2001 |
| WO | 2001031497 A1 | 5/2001 |
| WO | 2001050732 A2 | 7/2001 |
| WO | 2001065762 A2 | 9/2001 |
| WO | 2002001880 A1 | 1/2002 |
| WO | 2002008948 A2 | 1/2002 |
| WO | 2002035832 A2 | 5/2002 |
| WO | 2002037210 A2 | 5/2002 |
| WO | 2002054196 A2 | 7/2002 |
| WO | 2003030000 A1 | 4/2003 |
| WO | 2003096136 A2 | 11/2003 |
| WO | 2004054247 A1 | 6/2004 |
| WO | 2004097811 A1 | 11/2004 |
| WO | 2004102571 A1 | 11/2004 |
| WO | 2006018843 A2 | 2/2006 |
| WO | 2006018843 A3 | 12/2006 |
| WO | 2007044590 A2 | 4/2007 |
| WO | 2007113836 A2 | 10/2007 |
| WO | 2008010275 A1 | 1/2008 |
| WO | 2008042242 A2 | 4/2008 |
| WO | 2008086313 A1 | 7/2008 |
| WO | 2007113836 A3 | 11/2008 |
| WO | 2008135932 A2 | 11/2008 |
| WO | 2007113836 B1 | 12/2008 |
| WO | 2009065137 A1 | 5/2009 |
| WO | 2009070770 A1 | 6/2009 |
| WO | 2010060106 A1 | 5/2010 |
| WO | 2010080911 A1 | 7/2010 |
| WO | 2010089962 A1 | 8/2010 |
| WO | 2010108053 A1 | 9/2010 |
| WO | 2010111261 A1 | 9/2010 |
| WO | 2010122447 A1 | 10/2010 |
| WO | 2010147878 A1 | 12/2010 |
| WO | 2011042898 A1 | 4/2011 |
| WO | 2011042900 A1 | 4/2011 |
| WO | 2011068668 A1 | 6/2011 |
| WO | 2011103364 A1 | 8/2011 |
| WO | 2011132184 A1 | 10/2011 |
| WO | 2011135558 A1 | 11/2011 |
| WO | 2012035533 A2 | 3/2012 |
| WO | 2012035534 A2 | 3/2012 |
| WO | 2012035534 A3 | 7/2012 |
| WO | 2012094171 A1 | 7/2012 |
| WO | 20120094181 A2 | 7/2012 |
| WO | 20120094189 A1 | 7/2012 |
| WO | 2012035533 A3 | 8/2012 |
| WO | 2012162806 A1 | 12/2012 |
| WO | 2012171113 A1 | 12/2012 |
| WO | 2013030833 A1 | 3/2013 |
| WO | 2013032518 A2 | 3/2013 |
| WO | 2013103986 A2 | 7/2013 |
| WO | 2013111126 A2 | 8/2013 |
| WO | 2013032518 A3 | 9/2013 |
| WO | 2013144942 A1 | 10/2013 |
| WO | 2014145901 A1 | 9/2014 |
| WO | 2014193996 A2 | 12/2014 |
| WO | 2014193996 A3 | 2/2015 |
| WO | 2015031982 A1 | 3/2015 |
| WO | 2013111126 A3 | 6/2015 |

OTHER PUBLICATIONS

Nelson, Mark "Arithmetic Coding + Statistical Modeling = Data Compression: Part 1—Arithmetic Coding", Doctor Dobb's Journal, Feb. 1991, printed from http://www.dogma.net/markn/articles/arith/part1.htm; printed Jul. 2, 2003, 12 pgs.

Nelson, Michael "IBM's Cryptolopes", Complex Objects in Digital Libraries Course, Spring 2001, Retrieved from http://www.cs.odu.edu/~mln/teaching/unc/inls210/?method=display&pkg_name=cryptolopes.pkg&element_name=cryptolopes.ppt, 12 pgs.

Noboru, "Play Fast and Fine Video on Web! codec", Co.9 No. 12, Dec. 1, 2003, 2 pgs.

Noe, A. "Matroska File Format (under construction!)", Retrieved from the Internet: URL:http://web.archive.org web/20070821155146/www.matroska.org/technical/specs/matroska.pdf [retrieved on Jan. 19, 2011], Jun. 24, 2007, pp. 1-51.

(56) References Cited

OTHER PUBLICATIONS

Noe, Alexander "AVI File Format", http://www.alexander-noe.com/video/documentation/avi.pdf, Dec. 14, 2006, pp. 1-26.
Noe, Alexander "Definitions", Apr. 11, 2006, retrieved from http://www.alexander-noe.com/video/amg/definitions.html on Oct. 16, 2013, 2 pgs.
Ooyala, "Widevine Content Protection", Ooyala Support Center for Developers. Ooyala, Inc., 2013. Jun. 3, 2013. http://support.ooyala.com/developers/documentation/concepts/player_v3_widevine_integration.html, 7 pgs.
Oyman et al, "Quality of Experience for HTTP Adaptive Streaming Services", IEEE Communications Magazine, Apr. 2012, vol. 50, No. 4, DOI: 10.1109/MCOM.2012.6178830, pp. 20-27.
Ozer, "The 2012 Encoding and Transcoding Buyers' Guide", Streamingmedia.com, Retrieved from: http://www.streamingmedia.com/Articles/Editorial/Featured-Articles/The-2012-Encoding-and-Transcoding-Buyers-Guide-84210.aspx, 2012, 8 pgs.
Ozer, Jan "Adaptive Streaming in the Field", Streaming Media, Dec. 2010-Jan. 2011, 9 pgs.
Padiadpu, Rashmi "Towards Mobile Learning: A SCORM Player for the Google Android Platform", Master Thesis, Hamburg University of Applied Sciences, 2008, 66 pgs.
Pantos, "HTTP Live Streaming, draft-pantos-http-live-streaming-10", IETF Tools, Oct. 15, 2012, Retrieved from: http://tools.ietf.org/html/draft-pantos-http-live-streaming-10, 37 pgs.
Pantos, R "HTTP Live Streaming: draft-pantos-http-live-streaming-06", Published by the Internet Engineering Task Force (IETF), Mar. 31, 2011, 24 pgs.
Papagiannaki et al., "Experimental Characterization of Home Wireless Networks and Design Implications", Infocom 2006, 25th IEEE International Conference of Computer Communications, Proceedings, Apr. 2006, 13 pgs.
Peek, David "Consumer Distributed File Systems", Dissertation, Doctor of Philosophy, Computer Science and Engineering, the University of Michigan, 2009, 118 pgs.
Phamdo, "Theory of Data Compression", printed on Oct. 10, 2003, 12 pgs.
RGB Networks, "Comparing Adaptive HTTP Streaming Technologies", Nov. 2011, Retrieved from: http://btreport.net/wp-content/uploads/2012/02/RGB-Adaptive-HTTP-Streaming-Comparison-1211-01.pdf, 20 pgs.
Rosenberg et al., "Indicating User Agent Capabilities in the Session Initiation Protocol (SIP)", Network Working Group, RFC 3840, Aug. 2004, 36 pgs.
Schulzrinne, H "Real Time Streaming Protocol 2.0 (RTSP): draft-ietfmmusic-rfc2326bis-27", MMUSIC Working Group of the Internet Engineering Task Force (IETF), Mar. 9, 2011, 296 pgs. (presented in two parts).
Siglin, "HTTP Streaming: What You Need to Know", streamingmedia.com, 2010, 15 pgs.
Siglin, "Unifying Global Video Strategies, MP4 File Fragmentation for Broadcast, Mobile and Web Delivery", Nov. 16, 2011, 16 pgs.
Silvia, "adaptive HTTP streaming for open codecs", Oct. 9, 2010, [retrieved on: Mar. 2, 2018, 15 pgs.
Tan, Yap-Peng et al., "Video transcoding for fast forward/reverse video playback", IEEE ICIP, 2002, 4 pgs.
Taxan, "AVel LinkPlayer2 for Consumer", I-O Data USA—Products—Home Entertainment, printed May 4, 2007 from http://www.iodata.com/usa/products/products.php?cat=HNP&sc=AVEL&pld=AVLP2/DVDLA&ts=2&tsc, 1 page.
Tripathi et al, "Improving Multimedia Streaming with Content-Aware Video Scaling", Retrieved from: http://digitalcommons.wpi.edu/computerscience-pubs/96, 2001, 17 pgs.
Unknown, "AVI RIFF File Reference (Direct X 8.1 C++ Archive)", printed from http://msdn.microsoft.com/archive/en-us/dx81_c/directx_cpp/htm/avirifffilereference.asp?fr . . . on Mar. 6, 2006, 7 pgs.
Unknown, "Entropy and Source Coding (Compression)", TCOM 570, Sep. 1999, pp. 1-22.
Unknown, "MPEG-4 Video Encoder: Based on International Standard ISO/IEC 14496-2", Patni Computer Systems, Ltd., publication date unknown, 15 pgs.
Venkatramani et al., "Securing Media for Adaptive Streaming", Multimedia 2003 Proceedings of the Eleventh ACM International Conference on Multimedia, Nov. 2-8, 2003, Berkeley, California, 4 pgs.
Wang et al., "Image Quality Assessment: From Error Visibility to Structural Similarity", IEEE Transactions on Image Processing, Apr. 2004, vol. 13, No. 4, pp. 600-612.
Wu, Feng et al., "Next Generation Mobile Multimedia Communications: Media Codec and Media Transport Perspectives", in China Communications, Oct. 2006, pp. 30-44.
Zambelli, "IIS Smooth Streaming Technical Overview", Microsoft Corporation, Mar. 2009, 17 pgs.
Cloakware Corporation, "Protecting Digital Content Using Cloakware Code Transformation Technology", Version 1.2, May 2002, 10 pgs.
EP11774529 Supplementary European Search Report, completed Jan. 31, 2014, 2 pgs.
European Search Report Application No. EP 08870152, Search Completed May 19, 2011, dated May 26, 2011, 9 pgs.
European Search Report for Application 11855103.5, search completed Jun. 26, 2014, 9 pgs.
European Search Report for Application 11855237.1, search completed Jun. 12, 2014, 9 pgs.
European Supplementary Search Report for Application EP09759600, completed Jan. 25, 2011, 11 pgs.
Extended European Search Report for European Application EP10821672, completed Jan. 30, 2014, 3 pgs.
Extended European Search Report for European Application EP11824682, completed Feb. 6, 2014, 4 pgs.
Extended European Search Report for European Application No. 14763140.2, Search completed Sep. 26, 2016, dated Oct. 5, 2016, 9 pgs.
Federal Computer Week, "Tool Speeds Info to Vehicles", Jul. 25, 1999, 5 pgs.
Final draft ETSI ES 202 109, V1.1.1, ETSI Standard, Terrestrial Trunked Radio (TETRA); Security; Synchronization mechanism for end-to-end encryption, Oct. 2002, 17 pgs.
HTTP Live Streaming Overview, Networking & Internet, Apple, Inc., Apr. 1, 2011, 38 pgs.
IBM Corporation and Microsoft Corporation, "Multimedia Programming Interface and Data Specifications 1.0", Aug. 1991, printed from http://www.kk.iij4u.or.jp/~kondo/wave/mpidata.txt on Mar. 6, 2006, 100 pgs.
InformationWeek, "Internet on Wheels", InformationWeek: Front End: Daily Dose, Jul. 20, 1999, Printed on Mar. 26, 2014, 3 pgs.
International Preliminary Report for Application No. PCT/US2011/066927, Filed Dec. 22, 2011, Report dated Jul. 10, 2013, 13 pgs.
International Preliminary Report for International Application No. PCT/US2011/067243, International Filing Date Dec. 23, 2011, dated Jul. 10, 2013, 7 pgs.
International Preliminary Report on Patentability for International Application PCT/US14/30747, Report dated Sep. 15, 2015, dated Sep. 24, 2015, 6 pgs.
International Preliminary Report on Patentability for International Application No. PCT/US2007/063950, Report Completed Dec. 18, 2009, 3 pgs.
International Preliminary Report on Patentability for International Application No. PCT/US2008/083816, dated May 18, 2010, 6 pgs.
International Preliminary Report on Patentability for International Application No. PCT/US2010/56733, dated Jun. 5, 2012, 5 pgs.
International Preliminary Report on Patentability for International Application No. PCT/US2011/068276, dated Mar. 4, 2014, 23 pgs.
International Preliminary Report on Patentability for International Application PCT/US2011/067167, dated Feb. 25, 2014, 8 pgs.
International Preliminary Report on Patentability for International Application PCT/US2013/043181, dated Dec. 31, 2014, dated Jan. 8, 2015, 11 pgs.
International Preliminary Report on Patentability for International Application PCT/US2014/039852, dated Dec. 1, 2015, dated Dec. 5, 2015, 8 pgs.

(56) References Cited

OTHER PUBLICATIONS

International Search Report and Written Opinion for International Application No. PCT/US07/63950, completed Feb. 19, 2008; dated Mar. 19, 2008, 9 pgs.
International Search Report and Written Opinion for International Application No. PCT/US08/87999, completed Feb. 7, 2009, dated Mar. 19, 2009, 6 pgs.
International Search Report and Written Opinion for International Application No. PCT/US09/46588, completed Jul. 13, 2009, dated Jul. 23, 2009, 7 pgs.
International Search Report and Written Opinion for International Application No. PCT/US2004/041667, completed May 24, 2007, dated Jun. 20, 2007, 6 pgs.
International Search Report and Written Opinion for International Application No. PCT/US2005/025845, completed Feb. 5, 2007 and dated May 10, 2007, 6 pgs.
International Search Report and Written Opinion for International Application No. PCT/US2008/083816, completed Jan. 10, 2009, dated Jan. 22, 2009, 7 pgs.
International Search Report and Written Opinion for International Application No. PCT/US2010/020372, Completed Feb. 10, 2009, dated Mar. 1, 2010, 7 pgs.
International Search Report and Written Opinion for International Application No. PCT/US2010/56733, Completed Jan. 3, 2011, dated Jan. 14, 2011, 9 pgs.
International Search Report and Written Opinion for International Application No. PCT/US2011/067243, International Filing Date Dec. 23, 2011, Search Completed Apr. 24, 2012, dated May 8, 2012, 8 pgs.
International Search Report and Written Opinion for International Application No. PCT/US2013/043181, completed Nov. 27, 2013, dated Dec. 6, 2013, 12 pgs.
International Search Report and Written Opinion for International Application PCT/US14/30747, completed Jul. 30, 2014, dated Aug. 22, 2014, 7 pgs.
International Search Report and Written Opinion for International Application PCT/US14/39852, completed Oct. 21, 2014, dated Dec. 5, 2014, 11 pgs.
International Search Report and Written Opinion for International Application PCT/US2011/066927, completed Apr. 3, 2012, dated Apr. 20, 2012, 14 pgs.
International Search Report and Written Opinion for International Application PCT/US2011/067167, completed Jun. 19, 2012, dated Jul. 2, 2012, 11 pgs.
International Search Report and Written Opinion for International Application PCT/US2011/068276, completed Jun. 19, 2013, dated Jul. 8, 2013, 24 pgs.
International Search Report and Written Opinion for PCT/US2013/020572, International Filing Date Jan. 7, 2013, Search Completed Mar. 19, 2013, dated Apr. 29, 2013, 10 pgs.
International Telecommunication Union, Telecommunication Standardization Sector of ITU, H.233, Line Transmission of Non-Telephone Signals, Confidentiality System for Audiovisual Services, ITU-T Recommendation H.233, Mar. 1993, 18 pgs.
ITS International, "Fleet System Opts for Mobile Server", Aug. 26, 1999, Printed on Oct. 21, 2011 from http://www.itsinternational.com/News/article.cfm?recordID=547, 2 pgs.
Lifehacker—Boxqueue Bookmarklet Saves Videos for Later Boxee Watching, printed Jun. 16, 2009 from http://feeds.gawker.com/~r/lifehacker/full/~3/OHvDmrIgZZc/boxqueue-bookmarklet-saves-videos-for-late-boxee-watching, 2 pgs.
Linksys Wireless-B Media Adapter Reviews, printed May 4, 2007 from http://reviews.cnet.com/Linksys_Wireless_B_Media_Adapter/4505-6739_7-30421900.html?tag=box, 5 pgs.
Linksys, KISS DP-500, printed May 4, 2007 from http://www.kiss-technology.com/?p=dp500, 2 pgs.
Linksys® : "Enjoy your digital music and pictures on your home entertainment center, without stringing wires!", Model No. WMA 11B, printed May 9, 2007 from http://www.linksys.com/servlet/Satellite?c=L_Product_C2&childpagename=US/Layout&cid=1115416830950&p, 4 pgs.
Microsoft Corporation, "Chapter 8, Multimedia File Formats" 1991, Microsoft Windows Multimedia Programmer's Reference, 23 pgs.
Microsoft Media Platform: Player Framework, "Microsoft Media Platform: Player Framework v2.5 (formerly Silverlight Media Framework)", May 3, 2011, 2 pgs.
Microsoft Media Platform: Player Framework, "Silverlight Media Framework v1.1", Jan. 2010, 2 pgs.
Microsoft Windows® XP Media Center Edition 2005, Frequently asked Questions, printed May 4, 2007 from http://www.microsoft.com/windowsxp/mediacenter/evaluation/faq.mspx, 6 pgs.
Microsoft Windows® XP Media Center Edition 2005: Features, printed May 9, 2007, from http://www.microsoft.com/windowsxp/mediacenter/evaluation/features.mspx, 4 pgs.
Office Action for Chinese Patent Application No. CN200880127596.4, dated May 6, 2014, 8 pgs.
Office Action for U.S. Appl. No. 13/223,210, dated Apr. 30, 2015, 14 pgs.
Office Action for U.S. Appl. No. 14/564,003, dated Apr. 17, 2015, 28 pgs.
Open DML AVI-M-JPEG File Format Subcommittee, "Open DML AVI File Format Extensions", Version 1.02, Feb. 28, 1996, 29 pgs.
"IBM Closes Cryptolopes Unit," Dec. 17, 1997, CNET News, Printed on Apr. 25, 2014 from http://news.cnet.com/IBM-closes-Cryptolopes-unit/2100-1001_3206465.html, 3 pgs.
"Information Technology-Coding of Audio Visual Objects—Part 2: Visual" International Standard, ISO/IEC 14496-2, Third Edition, Jun. 1, 2004, pp. 1-724. (presented in three parts).
U.S. Appl. No. 13/905,804, "Notice of Allowance," dated Aug. 12, 2015, 7 pgs.
Broadq—the Ultimate Home Entertainment Software, printed May 11, 2009 from ittp://web.srchive.org/web/20030401122010/www.broadq.com/qcasttuner/, 1 page.
"What is a VOB file", http://www.mpucoder.com/DVD/vobov.html, printed on Jul. 2, 2009, 2 pgs.
"What's on a DVD?", printed Aug. 22, 2009 from http://www.doom9.org/dvd-structure.htm, 5 pgs.
U.S. Appl. No. 13/224,298, "Final Office Action Received", dated May 19, 2014, 26 pgs.
U.S. Appl. No. 13/905,804, "Non-Final Office Action Received", U.S. Appl. No. 13/905,804, "Non-Final Office Action Received", dated Jul. 25, 2014, 15 pgs.
Adams et al, "Will http adaptive streaming become the dominant mode of video delivery in cable networks?", https://www.nctatechnicalpapers.com/Paper/2011/2011-will-http-adaptive-streaming-become-the-dominant-mode-of-video-delivery-in-cable-networks-, 10 pgs.
Adhikari et al., "Unreeling Netflix: Understanding and Improving Multi-CDN Movie Delivery", 2012 Proceedings IEEE InfoCom, Mar. 25-30, 2012, Orlando, Florida, 9 pgs.
Adzic et al, "Optimized Adaptive HTTP Streaming for Mobile Devices", International Society for Optics and Photonics, Applications of Digital Image Processing XXXIV, vol. 8135, Sep. 2011, 10 pgs.
Akhshabi et al., "An Experimental Evaluation of Rate-Adaptation Algorithms in Adaptive Streaming over HTTP", MMSys'11, Feb. 23-25, 2011, 12 pgs.
Anonymous, "Method for the encoding of a compressed video sequence derived from the same video sequence compressed at a different bit rate without loss of data", ip.com, ip.com No. IPCOM000008165D, May 22, 2002, pp. 1-9.
Author Unknown, "Blu-ray Disc—Blu-ray Disc—Wkipedia, the free encyclopedia", printed Oct. 30, 2008 from http://en.wikipedia.org/wiki/Blu-ray_Disc, 11 pgs.
Author Unknown, "Blu-ray Movie Bitrates Here—Blu-ray Forum", printed Oct. 30, 2008 from http://forum.blu-ray.com/showthread.php?t=3338, 6 pgs.
Author Unknown, "MPEG-4 Video Encoder: Based on International Standard ISO/IEC 14496-2", Patni Computer Systems, Ltd., printed Jan. 24, 2007, USA, 15 pgs.

(56) References Cited

OTHER PUBLICATIONS

Author Unknown, "O'Reilly—802.11 Wireless Networks: The Definitive Guide, Second Edition", printed Oct. 30, 2008 from http://oreilly.com/catalog/9780596100520, 2 pgs.
Author Unknown, "Tunneling QuickTime RTSP and RTP over HTTP", Published by Apple Computer, Inc.: 1999 (month unknown) 6 pgs.
Author Unknown, "Turbo-Charge Your Internet and PC Performance", printed Oct. 30, 2008 from Speedtest.net—the Global Broadband Speed Test, 1 page.
Author Unknown, "White paper, the New Mainstream Wireless LAN Standard", Broadcom Corporation, Jul. 2003, 12 pgs.
Blasiak, "Video Transrating and Transcoding: Overview of Video Transrating and Transcoding Technologies", Ingenient Technologies, TI Developer Conference, Aug. 6-8, 2002, 22 pgs.
Bloom et al., "Copy Protection for DVD Video", Proceedings of the IEEE, vol. 87, No. 7, Jul. 1999, pp. 1267-1276.
Bross et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 600 pgs. (presented in three parts).
Casares et al., "Simplifying Video Editing Using Metadata", DIS2002, 2002, 10 pgs.
Concolato et al., "Live HTTP Streaming of Video and Subtitles within a Browser", MMSys 2013, Feb. 26-Mar. 1, 2013, Oslo, Norway, 5 pgs.
De Cock et al., "Complexity-Based Consistent-Quality Encoding in the Cloud", IEEE International Conference on Image Processing (ICIP), Date of Conference Sep. 25-28, 2016, Phoenix, AZ, pp. 1484-1488.
Deutscher, "IIS Transform Manager Beta—Using the MP4 to Smooth Task", Retrieved from: https://web.archive.org/web/20130328111303/http://blog.johndeutscher.com/category/smooth-streaming, Blog post of Apr. 29, 2011, 14 pgs.
Eskicioglu et al., "An Integrated Approach to Encrypting Scalable Video", Proceedings IEEE International Conference on Multimedia and Expo, Aug. 26-29, 2002, Lausanne, Switzerland, 4 pgs.
Fecheyr-Lippens, "A Review of HTTP Live Streaming", Internet Citation, Jan. 25, 2010, 38 pgs.
Gannes, "The Lowdown on Apple's HTTP Adaptive Bitrate Streaming", GigaOM, Jun. 10, 2009, 12 pgs.
Garg et al., "An Experimental Study of Throughput for UDP and VoIP Traffic in IEEE 802.11b Networks", Wreless Communications and Networkings, Mar. 2003, pp. 1748-1753.
Gast, "When is 54 Not Equal to 54? a Look at 802.11a, b and g Throughput", Aug. 8, 2003, printed Oct. 30, 2008 from www.oreillynet.com/pub/a/wireless/2003/08/08/wireless_throughput.html, 4 pgs.
Ghosh, "Enhancing Silverlight Video Experiences with Contextual Data", Retrieved from: http://msdn.microsoft.com/en-us/magazine/ee336025.aspx, 2010, 15 pgs.
Griffith, Eric "The Wireless Digital Picture Frame Arrives", W-Fi Planet, printed May 4, 2007 from http://www.wi-fiplanet.com/news/article.php/3093141, Oct. 16, 2003, 3 pgs.
Hartung et al., "DRM Protected Dynamic Adaptive HTTP Streaming", MMSys 2011 Proceedings of the Second Annual ACM Conference on Multimedia Systems, San Jose, California, Feb. 23-25, 2011, pp. 277-282.
Hurtado Guzman, Juan Esteban "Development and Implementation of an Adaptive HTTP Streaming Framework for H264/MVC Coded Media", Politecnico di Torino, Nov. 2010, 108 pgs.
Hwang et al., "Efficient and User Friendly Inter-domain Device Authentication/Access control for Home Networks", Proceedings of the 2006 International Conference on Embedded and Ubiquitous Computing, Seoul, Korea, Aug. 1-4, 2006, 10 pgs.
Inlet Technologies, "Adaptive Delivery to iDevices", 2010, 2 pgs.
Inlet Technologies, "Adaptive delivery to iPhone 3.0", 2009, 2 pgs.
Inlet Technologies, "HTTP versus RTMP", 2009, 3 pgs.
Inlet Technologies, "The World's First Live Smooth Streaming Event: The French Open", 2009, 2 pgs.
I-O Data, "Innovation of technology arrived", Nov. 2004, Retrieved from http://www.iodata.com/catalogs/AVLP2DVDLA_Flyer200505.pdf, 2 pgs.
Kaspar et al., "Using HTTP Pipelining to Improve Progressive Download over Multiple Heterogeneous Interfaces", IEEE ICC proceedings, 2010, 5 pgs.
Kim, Kyuheon "MPEG-2 ES/PES/TS/PSI", Kyung-Hee University, Oct. 4, 2010, 66 pgs.
Kozintsev et al., "Improving last-hop multicast streaming video over 802.11", Workshop on Broadband Wireless Multimedia, Oct. 2004, pp. 1-10.
Kurzke et al., "Get Your Content Onto Google TV", Google, Retrieved from: http://commondatastorage.googleapis.com/io2012/presentations/live%20to%20website/1300.pdf, 2012, 58 pgs.
Lang, "Expression Encoder, Best Practices for live smooth streaming broadcasting", Microsoft Corporation, 2010, retrieved from http://www.streamingmedia.com/conferences/west2010/presentations/SMWest-12010-Expression-Encoder.pdf, 20 pgs.
Levkov, "Mobile Encoding Guidelines for Android Powered Devices", Adobe Systems Inc., Addendum B, Dec. 22, 2010, 42 pgs.
Li et al, "Content-Aware Playout and Packet Scheduling for Video Streaming Over Wireless Links", IEEE Transactions on Multimedia, vol. 10, No. 5, Aug. 2008, pp. 885-895.
Lian et al., "Efficient video encryption scheme based on advanced video coding", Multimed. Tools Appl. vol. 38, 2008, pp. 75-89.
Lin et al., "Multipass Encoding for Reducing Pulsing Artifacts in Cloud Based Video Transcoding", IEEE International Conference on Image Processing (ICIP), Date of Conference Sep. 27, 30, 2015, Quebec City, QC, Canada, 5 pgs.
Liu et al., "A Formal Framework for Component Deployment", Oopsla 2006, Proceedings of the 21st Annual ACM Sigplan Conference on Object-Oriented Programming Systems, Language, and Applications, Portland, Oregon, Oct. 22-26, 2006, 19 pgs.
Long et al., "Silver: Simplifying Video Editing with Metadata", Demonstrations, CHI 2003: New Horizons, Apr. 5-10, 2003, pp. 628-629.
Matroska, "Diagram", Matroska, Technical/Info, Diagram, 2016, retrieved from https://www.matroska.org/technical/diagram/index.html on Jul. 20, 2017, 9 pgs.
Matroska, "Specifications", Matroska, Technical/Info, Specifications, Jun. 25, 2017, retrieved from https://www.matroska.org/technical/specs/index.html on Jul. 20, 2017, 20 pgs.
Miras, "On Quality Aware Adaptation of Internet Video", University of London, PhD dissertation, 2004, 181 pgs.
Morrison, "EA IFF 85 Standard for Interchange Format Files", Jan. 14, 1985, printed from http://www.dcs.ed.ac.uk/home/mxr/gfx/2d/IFF.txt on Mar. 6, 2006, 24 pgs.
Moscoso, Pedro Gomes "Interactive Internet TV Architecture Based on Scalable Video Coding", Instituto Superior Techico, Universidad Technica de Lisboa, May 2011, 103 pgs.
MSDN, "Adaptive streaming, Expression Studio 2.0", Apr. 23, 2009, 2 pgs.
pc world.com, Future Gear: PC on the HiFi, and the TV, from http://www.pcworld.com/article/id,108818-page,1/article.html, printed May 4, 2007, from IDG Networks, 2 pgs.
Qtv—About BroadQ, printed May 11, 2009 from http://www.broadq.com/en/about.php, 1 page.
Supplementary European Search Report for Application No. EP 04813918, Search Completed Dec. 19, 2012, 3 pgs.
Supplementary European Search Report for Application No. EP 10729513, completed Dec. 9, 2013, 4 pgs.
Supplementary European Search Report for EP Application 11774529, completed Jan. 31, 2014, 2 pgs.
Supplementary European Search Report for European Application No. 07758499.3, Report Completed Jan. 25, 2013, 8 pgs.
Windows Media Center Extender for Xbox, printed May 9, 2007 from http://www.xbox.com/en-US/support/systemuse/xbox/console/mediacenterextender.htm, 2 pgs.

(56) References Cited

OTHER PUBLICATIONS

Windows® XP Media Center Edition 2005, "Experience more entertainment", retrieved from http://download.microsoft.com/download/c/9/a/c9a7000a-66b3-455b-860b-1c16f2eecfec/MCE.pdf on May 9, 2007, 2 pgs.
Written Opinion for International Application No. PCT/US2005/025845 filed Jul. 21, 2005, report completed Feb. 5, 2007 and dated May 10, 2007, 5 pgs.
Invitation to Pay Add'l Fees Rcvd for International Application PCT/US14/39852, dated Sep. 25, dated Sep. 25, 2014, 2 pgs.
3GPP TS 26.247, V1.3.0, 3rd Generation Partnership Project; Technical Specification Group Services and System Aspects Transparent end-to-end Packet-switches Streaming Services (PSS);, Progressive Download and Dynamic Adaptive Streaming over HTTP (3GP-DASH) (Release 10), Mar. 2011, 72 pgs.
"Adaptive Streaming Comparison", Jan. 28, 2010, 5 pgs.
"Best Practices for Multi-Device Transcoding", Kaltura Open Source Video, Printed on Nov. 27, 2013 from knowledge.kaltura.com/best-practices-multi-device-transcoding, 13 pgs.
"Container format (digital)", printed Aug. 22, 2009 from http://en.wikipedia.org/wiki/Container_format_(digital), 4 pgs.
"Diagram | Matroska", Dec. 17, 2010, Retrieved from http://web.archive.org/web/201 01217114656/http:l/matroska.org/technical/diagram/index.html on Jan. 29, 2016, Dec. 17, 2010, 5 pgs.
"Draft CR: Trick Mode for HTTP Streaming", 3GPP TSG-SA4 Meeting #58, Apr. 26-30, 2010, Vancouver, Canada, S4-100237, 3 pgs.
"DVD- MPeg differences", printed Jul. 2, 2009 from http://dvd.sourceforge.net/dvdinfo/dvdmpeg.html, 1 page.
"DVD subtitles", sam.zoy.org/writings/dvd/subtitles, dated Jan. 9, 2001, printed Jul. 2, 2009, 4 pgs.
"Final Committee Draft of MPEG-4 streaming text format", International Organisation for Standardisation, Feb. 2004, 22 pgs.
"IBM Spearheading Intellectual Property Protection Technology for Information on the Internet; Cryptolope Containers Have Arrived", May 1, 1996, Business Wire, Printed on Aug. 1, 2014 from http://www.thefreelibrary.com/IBM+Spearheading+Intellectual+Property+Protection+Technology+for...-a018239381, 6 pgs.
"Information Technology—Coding of audio-visual objects—Part 14: MP4 file format", International Standard, ISO/IEC 14496-14, First Edition, Nov. 15, 2003, 18 pgs.
"Information Technology—Coding of audio-visual objects—Part 17: Streaming text", International Organisation for Standardisation, Feb. 2004, 22 pgs.
"Information technology—Coding of audio-visual objects—Part 18: Font compression and streaming", ISO/IEC 14496-18, First edition Jul. 1, 2004, 26 pgs.
"Information technology—Generic coding of moving pictures and associated audio information: Systems", International Standard ISO/IEC 13818-1, Second Edition, Dec. 1, 2000, 174 pgs. (presented in two parts).
"Information-Technology—Generic coding of moving pictures and associated audio: Systems, Recommendation H.222.0", International Standard, ISO/IEC 13818-1, Draft 1209, Apr. 25, 1995, 151 pgs.
"Information-Technology—Generic coding of moving pictures and associated audio: Systems, Recommendation H.222.0", International Standard, ISO/IEC 13818-1, Draft 1540, Nov. 13, 1994, 161 pgs.
KISS Players, "KISS DP-500", retrieved from http://www.kiss-technology.com/?p=dp500 on May 4, 2007, 1 page.
"Matroska", Wkipedia, Jul. 10, 2017, retrieved from https://en.wikipedia.org/wiki/Matroska on Jul. 20, 2017, 3 pgs.
"Matroska Streaming | Matroska", Retrieved from the Internet: URL:http://web.archive.org/web/201 0121711431 O/http://matroska.org/technical!streaming/index.html [retrieved on Jan. 29, 2016], Dec. 17, 2010, 2 pgs.
"MovieLabs Specification for Next Generation Video—Version 1.0", Motion Picture Laboratories, Inc., 2013, Retrieved from: http://movielabs.com/ngvideo/MovieLabs%20Specification%20for%20Next%20Generation%20Video%20v1.0.pdf, 5 pgs.
"MPEG-2", Wikipedia, Jun. 13, 2017, retrieved from https://en.wikipedia.org/wiki/MPEG-2 on Jul. 20, 2017, 13 pgs.
"MPEG-4 File Format, Version 2", Sustainability of Digital Formats: Planning for Library of Congress Collections, Retrieved from: https://www.loc.gov/preservation/digital/formats/fdd/fdd000155.shtml, Last updated Feb. 21, 2017, 8 pgs.
"MPEG-4 Part 14", Wkipedia, Jul. 10, 2017, retrieved from https://en.wikipedia.org/wiki/MPEG-4_Part_14 on Jul. 20, 2017, 5 pgs.
"Netflix turns on subtitles for PC, Mac streaming", Yahoo! News, Apr. 21, 2010, Printed on Mar. 26, 2014, 3 pgs.
"OpenDML AVI File Format Extensions", OpenDML AVI M-JPEG File Format Subcommittee, retrieved from www.the-labs.com/Video/odmlff2-avidef.pdf, Sep. 1997, 42 pgs.
"OpenDML AVI File Format Extensions Version 1.02", OpenDML AVI MJPEG File Format Subcommittee. Last revision: Feb. 28, 1996. Reformatting: Sep. 1997, 56 pgs.
"QCast Tuner for PS2", printed May 11, 2009 from http://web.archive.org/web/20030210120605/www.divx.com/software/detail.php?ie=39, 2 pgs.
"Series H: Audiovisual and Multimedia Systems Infrastructure of audiovisual services—Coding of moving video; High efficiency video coding", International Telecommunication Union, ITU-T H.265, Apr. 2015, 634 pgs. (presented in six parts).
"Smooth Streaming Client", the Official Microsoft IIS Site, Sep. 24, 2010, 4 pgs.
"Specifications | Matroska", Retrieved from the Internet: URL:http://web.archive.org/web/201 00706041303/http:/1www.matroska.org/technical/specs/index.html [retrieved on Jan. 29, 2016, Jul. 6, 2010, 14 pgs.
"Specifications Matroska", Dec. 17, 2010, [retrieved on Mar. 2, 2018], 12 pgs.
"Supplementary European Search Report for Application No. EP 10834935", International Filing Date Nov. 15, 2010, Search Completed May 27, 2014, 9 pgs.
"Supported Media Formats", Supported Media Formats, Android Developers, Printed on Nov. 27, 2013 from developer.android.com/guide/appendix/media-formats.html, 3 pgs.
"Text of ISO/IEC 14496-18/COR1, Font compression and streaming", ITU Study Group 16—Video Coding Experts Group—ISO/IEC MPEG & ITU-T VCEG(ISO/IEC JTC1/SC29/WG11 and ITU-T SG16 06), No. N8664, Oct. 27, 2006, 8 pgs.
"Text of ISO/IEC 14496-18/FDIS, Coding of Moving Pictures and Audio", ITU Study Group 16—Videocoding Experts Group—ISO/IEC MPEG & ITU-T VCEG(ISO/IEC JTC1/SC29/WG11 and ITU-T SG16 06), No. N6215, Dec. 2003, 26 pgs.
"Thread: SSME (Smooth Streaming Medial Element) config.xml review (Smooth Streaming Client configuration file)", Printed on Mar. 26, 2014, 3 pgs.
"Transcoding Best Practices", From movideo, Printed on Nov. 27,2013 from code.movideo.com/Transcoding_Best_Practices, 5 pgs.
"Using HTTP Live Streaming", iOS Developer Library, http://developer.apple.com/library/ios/#documentation/networkinginternet/conceptual/streamingmediaguide/UsingHTTPLiveStreaming/UsingHTTPLiveStreaming.html#//apple_ref/doc/uid/TP40008332-CH102-SW1, Feb. 11, 2014, 10 pgs.
"Video Manager and Video Title Set IFO file headers", printed Aug. 22, 2009 from http://dvd.sourceforge.net/dvdinfo/ifo.htm, 6 pgs.
"What is a DVD?", printed Aug. 22, 2009 from http://www.videohelp.com/dvd, 8 pgs.

* cited by examiner ated on Feb. 27, 2018 as U.S. Pat. No. 9,906,785. The
SYSTEMS, METHODS, AND MEDIA FOR TRANSCODING VIDEO DATA

CROSS-REFERENCE TO RELATED APPLICATIONS

The current application is a continuation of U.S. patent application Ser. No. 15/905,695 entitled, "Systems, Methods, and Media for Transcoding Video Data According to Encoding Parameters Indicated by Received Metadata" to Naletov et al., filed Feb. 26, 2018, which application is a continuation of U.S. patent application Ser. No. 13/841,943, entitled "Systems, Methods, and Media for Transcoding Video Data According to Encoding Parameters Indicated by Received Metadata" to Naletov et al., filed Mar. 15, 2013 and issued on Feb. 27, 2018 as U.S. Pat. No. 9,906,785. The disclosures of U.S. patent application Ser. Nos. 15/905,695 and 13/841,943 are hereby incorporated by reference in their entireties.

BACKGROUND OF THE INVENTION

Transcoding is an important task in video distribution applications. For example, a transcoder can receive input video data having a first format and convert the input video data into video data having a second format. More particularly, for example, the first format and the second format can correspond to different video coding standards, such as Motion JPEG, JPEG 2000, MPEG-2, MPEG-4, H.263, H.264, AVC, High Efficiency Video Coding (HEVC), etc. Alternatively or additionally, the first format and the second format can have different bitrates and/or resolutions.

There are many current approaches to transcoding video data. For example, a transcoder can decode video data compressed in a first format into raw video data and re-encode the raw video data into a second format. More particularly, for example, the transcoder can estimate encoding parameters and re-encode the raw video data using the estimated encoding parameters. The estimation of encoding parameters within a transcoder is very time-consuming.

Accordingly, new mechanisms for transcoding video data are desirable.

SUMMARY OF THE INVENTION

In view of the foregoing, systems, methods, and media for transcoding video data using metadata are provided.

In some embodiments, methods for transcoding video data using metadata are provided, the methods comprising: receiving a first plurality of encoded images from a storage device; decoding the first plurality of encoded images based on a first coding scheme to generate a plurality of decoded images; receiving a plurality of encoding parameters from the storage device; and encoding the plurality of decoded images into a second plurality of encoded images based on a second coding scheme and the plurality of encoding parameters.

In some embodiments, systems for transcoding video data using metadata are provided, the systems comprising: processing circuitry configured to: receive a first plurality of encoded images from a storage device; decode the first plurality of encoded images based on a first coding scheme to generate a plurality of decoded images; receive a plurality of encoding parameters from the storage device; and encode the plurality of decoded images into a second plurality of encoded images based on a second coding scheme and the plurality of encoding parameters.

In some embodiments, non-transitory media containing computer-executable instructions that, when executed by a processing circuitry, cause the processing circuitry to performing a method for transcoding video data are provided, the method comprising: receiving a first plurality of encoded images from a storage device; decoding the first plurality of encoded images based on a first coding scheme to generate a plurality of decoded images; receiving a plurality of encoding parameters from the storage device; and encoding the plurality of decoded images into a second plurality of encoded images based on a second coding scheme and the plurality of encoding parameters.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF EMBODIMENTS

This invention generally relates to mechanisms (which can be systems, methods, media, etc.) for transcoding video data based on metadata. In some embodiments, the mechanisms can be used to transcode video data having a first format into video data having a second format.

In some embodiments, the mechanisms can receive a compressed bitstream and media metadata. The mechanisms can decompress the compressed bitstream and generate decoded video data based on a first coding scheme. The mechanisms can then encode the decoded video data based on a second coding scheme.

In some embodiments, the media metadata can include any suitable data. For example, the media metadata can include a set of coding parameters that can be used to encoding video data. More particularly, the media metadata can include information about one or more video scenes, such as a scene change indication signal, the number of frames between two scenes, the type of a video scene, etc. The media metadata can also include motion data, intra-prediction information, picture complexity information, etc. about video data.

In some embodiments, the mechanisms can encode the decoded video data using the media content data. For example, the mechanisms can generate a prediction image based on the motion data, the intra-prediction information, etc. As another example, the mechanisms can perform rate-control on the decoded video data based on the information about the video scenes, picture complexity information, etc.

Figure 1:
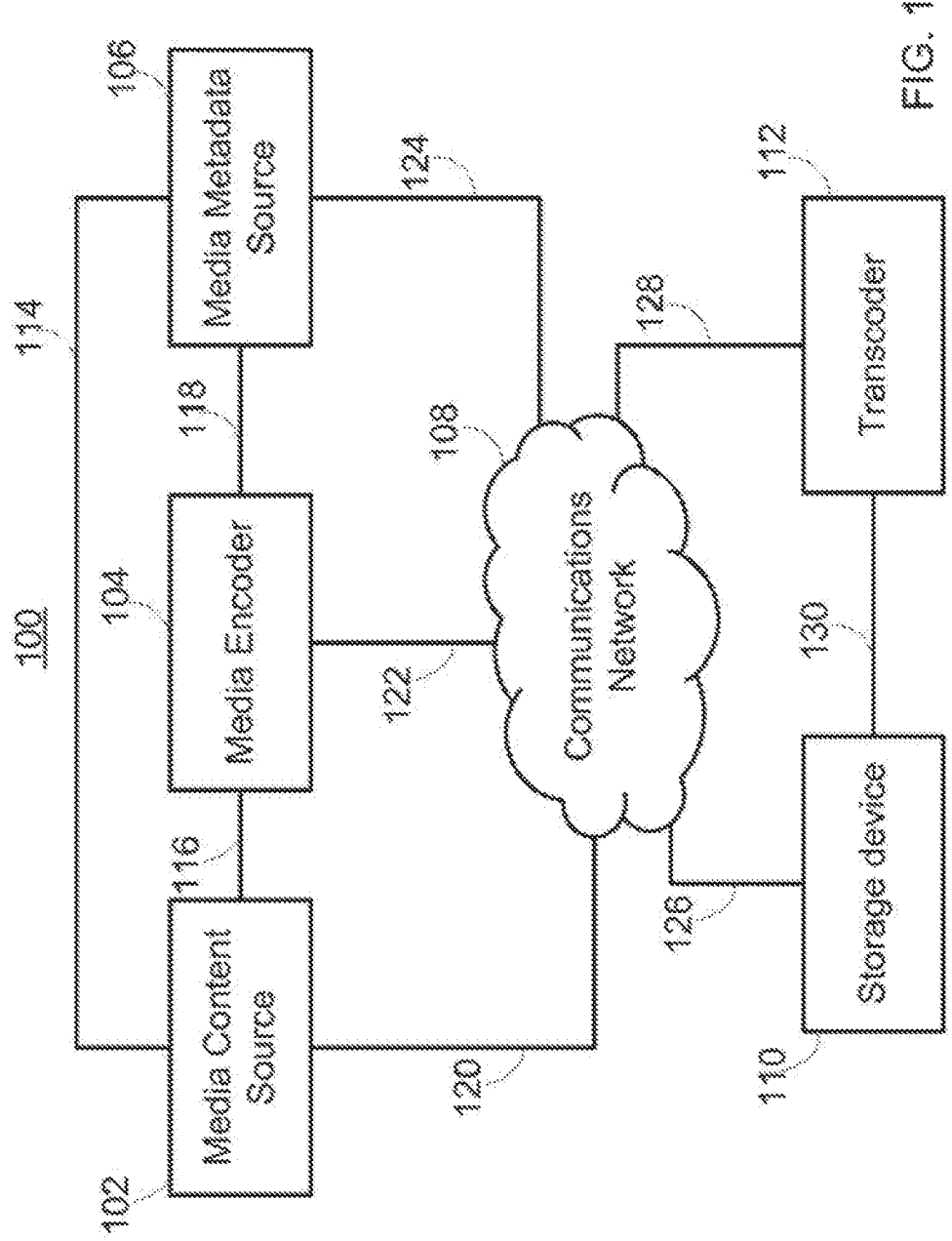
FIG. 1 shows a generalized block diagram of an example of an architecture of hardware that can be used in accordance with some embodiments of the invention.

Turning to FIG. 1, a generalized block diagram of an example 100 of an architecture of hardware that can be used in accordance with some embodiments is shown. As illustrated, architecture 100 can include a media content source 102, a media encoder 104, a media metadata source 106, a communications network 108, a storage device 110, a transcoder 112, and communications paths 114, 116, 118, 120, 122, 124, 126, 128, and 130.

Media content source 102 can include any suitable device that can provide media content. For example, media content source 102 can include one or more suitable cameras that can be configured to capture still images or moving images. As another example, media content source 102 can include one or more types of content distribution equipment for distributing any suitable media content, including television distribution facility equipment, cable system head-end equipment, satellite distribution facility equipment, programming source equipment (e.g., equipment of television broadcasters, such as NBC, ABC, HBO, etc.), intermediate distribution facility equipment, Internet provider equipment, on-demand media server equipment, and/or any other suitable media content provider equipment. NBC is a trademark owned by the National Broadcasting Company, Inc., ABC is a trademark owned by the ABC, INC., and HBO is a trademark owned by the Home Box Office, Inc.

Media content source 102 may be operated by the originator of content (e.g., a television broadcaster, a Webcast provider, etc.) or may be operated by a party other than the originator of content (e.g., an on-demand content provider, an Internet provider of content of broadcast programs for downloading, etc.).

Media content source 102 may be operated by cable providers, satellite providers, on-demand providers, Internet providers, providers of over-the-top content, and/or any other suitable provider(s) of content.

Media content source 102 may include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

As referred to herein, the term "media content" or "content" should be understood to mean one or more electronically consumable media assets, such as television programs, pay-per-view programs, on-demand programs (e.g., as provided in video-on-demand (VOD) systems), Internet content (e.g., streaming content, downloadable content, Webcasts, etc.), movies, films, video clips, audio, audio books, and/or any other media or multimedia and/or combination of the same. As referred to herein, the term "multimedia" should be understood to mean media content that utilizes at least two different content forms described above, for example, text, audio, images, video, or interactivity content forms. Media content may be recorded, played, displayed or accessed by user equipment devices, but can also be part of a live performance. In some embodiments, media content can include over-the-top (OTT) content. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC.

Media content can be provided from any suitable source in some embodiments. In some embodiments, media content can be electronically delivered to a user's location from a remote location. For example, media content, such as a Video-On-Demand movie, can be delivered to a user's home from a cable system server. As another example, media content, such as a television program, can be delivered to a user's home from a streaming media provider over the Internet.

Media encoder 104 can include any suitable circuitry that is capable of encoding media content. For example, media encoder 104 can include one or more suitable video encoders, audio encoders, video decoders, audio decoders, etc. More particularly, for example, media encoder 104 can include one or more video encoders that can encode video data including a set of images in accordance with a suitable coding standard, such as Motion JPEG, JPEG 2000, MPEG-2, MPEG-4, H.263, H.264, AVC, High Efficiency Video Coding (HEVC), etc. As referred to herein, an image can have any suitable size and shape. For example, an image can be a frame, a field, or any suitable portion of a frame or a field, such as a slice, a block, a macroblock, a set of macroblocks, a coding tree unit (CTU), a coding tree block (CTB), etc.

Media metadata source 106 can include any suitable circuitry that is capable of providing metadata for media content. The metadata for media content can include any suitable information about the media content. For example, the metadata can include one or more coding parameters that can be used by suitable encoding circuitry and/or suitable decoding circuitry to encode and/or decode video data including multiple video frames.

In a more particular example, the metadata can include information about one or more video scenes, each of which can be composed of a set of images that have similar content. More particularly, for example, the metadata can include scene change information that can indicate the start and/or end of one or more scene changes in the video data. In some embodiments, the metadata can also include a set of parameters that can indicate the type of each of the scene changes, such as a shot change, a fading change, a dissolving change, etc. In some embodiments, the metadata can include the number of images between two scene changes. For example, the metadata can include the number of images between two consecutive scene changes, two scene changes of a given type (e.g., such as two shot changes), etc.

In another more particular example, the media metadata can include picture complexity information. The picture complexity information can include any suitable information about the spatial and/or temporal complexity of an image, such as a frame, a field, a slice, a macroblock, a sub-macroblock, a CTU, a CTB, etc.

In some embodiments, for example, the picture complexity information can include spatial complexity of an image that can indicate the amount of intra-distortion across the image. The amount of intra-distortion can be measured in any suitable manner. For example, the amount of intra-distortion of the image can be measured based on the variances of pixel values, luminance, brightness, or other characteristics of the image using a suitable metric, such as the mean absolute difference (MAD), the mean square error (MSE), etc. In some embodiments, the spatial complexity of a frame can be measured using the sum of the spatial complexity of the macroblocks and/or CTUs of the frame. In some embodiments, the picture complexity information can include a map of spatial complexity distribution within a frame for each frame of the video data.

In some embodiments, for example, the picture complexity information can include temporal complexity of an image that can indicate the amount of motion between the image and one or more reference images. The amount of motion can be represented in any suitable manner. For example, the amount of motion between the image and a reference can be measured using a suitable difference metric, such as the sum of the absolute difference (SAD), the sum of the squared difference (SSD), the mean absolute difference (MAD), the sum of absolute transformed differences (SAID), etc. More particularly, for example, the temporal complexity of a frame can be represented as the SAD, SSD, MAD, SAID, etc. between two consecutive frames. In some embodiments, the picture complexity information can include a map of temporal complexity distribution within a frame for each frame of the video data.

In yet another more particular example, the metadata can include motion data about the video data. The motion data can be generated in any suitable manner and can include any suitable data about changes among video frames due to object motions, camera motions, uncovered regions, lighting changes, etc. More particularly, for example, media metadata source 106 can generate a motion vector map for each video frame of the media content, motion characteristics (e.g., high motion, slow motion, etc.) of one or a set of frames, the number of B-frames between two P-frames, etc. In some embodiments, the motion data can be generated based on a suitable motion estimation algorithm, such as a block matching algorithm, an optical flow algorithm, a sub-pixel motion estimation algorithm, a hieratical block matching algorithm, etc. For example, in some embodiments, the motion vector map can include a set of integer vectors corresponding to each integer pixel of a video frame. As another example, the motion vector map can include a set of fractional motion vectors corresponding to each sub-pixel of the video frame (e.g., ½ pixel, ¼ pixel, ⅛ pixel, etc.). In some embodiments, the media metadata can also include one or more reference lists that can contain a set of frames that can serve as reference frames.

As yet another example, the media metadata can include intra-prediction data about the media content. The intra prediction data can include any suitable data that can be used for intra prediction under a suitable coding standard. For example, the intra-prediction data can include a set of candidate intra prediction modes, such as a vertical mode, a horizontal mode, a DC mode, a diagonal down-left mode, a diagonal down-right mode, a vertical-right mode, a horizontal-down node, a vertical-left mode, a horizontal-up mode, a plane mode, an intra-angular mode, etc. Additionally, the intra-prediction data can include a coding cost and/or distortion corresponding to each intra-prediction mode.

In some embodiments, the media metadata can be stored based on the play order of the video frames.

Storage device 110 can be any suitable digital storage mechanism in some embodiments. For example, storage 110 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 110 may be used to store media content, media metadata, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions), in some embodiments. In some embodiments, storage 110 can store media content, encoded video data, and/or metadata provided by media content source 102, media encoder 104, and/or media metadata source 106.

Transcoder 112 can include any suitable circuitry that is capable of converting input media content having a first format into media content having a second format. For example, transcoder 112 can include a suitable video transcoder that can convert a first set of images that are encoded in accordance with a first coding scheme into a second set of images that are encoded in accordance with a second coding scheme. In some embodiments, the first coding scheme and the second coding scheme may have different target bitrates. In some embodiments, the first set of encoded images and the second set of encoded images may have different resolutions, such as spatial resolutions, temporal resolutions, quality resolutions, etc. In some embodiments, the first coding scheme and the second coding scheme may correspond to different coding standards, such as Motion JPEG, JPEG 2000, MPEG-2, MPEG-4/AVC, H.263, H.264, High Efficiency Video Coding (HEVC), etc. More particularly, for example, in some embodiments, transcoder 112 can convert a set of images encoded based on MPEG-2 standard into a set of images encoded based on HEVC standard.

In some embodiments, communications network 108 may be any one or more networks including the Internet, a mobile phone network, a mobile voice, a mobile data network (e.g., a 3G, 4G, or LTE network), a cable network, a satellite network, a public switched telephone network, a local area network, a wide area network, a fiber-optic network, any other suitable type of communications network, and/or any suitable combination of communications networks.

In some embodiments, media content source 102, media encoder 104, media metadata source 106, storage device 110, and transcoder 112 can be implemented in any suitable hardware. For example, each of media content source 102, media encoder 104, media metadata source 106, storage 126, and transcoder 112 can be implemented in any of a general purpose device such as a computer or a special purpose device such as a client, a server, mobile terminal (e.g., mobile phone), etc. Any of these general or special purpose devices can include any suitable components such as a hardware processor (which can be a microprocessor, digital signal processor, a controller, etc.).

In some embodiments, each of media content source 102, media encoder 104, media metadata source 106, storage device 110, and transcoder 112 can be implemented as a stand-alone device or integrated with other components of architecture 100.

In some embodiments, media content source 102 can be connected to media metadata source 106 through communications path 114. In some embodiments, media encoder 104 can be connected to media content source 102 and media metadata source 106 through communications paths 116 and 118, respectively. In some embodiments, communications network 108 can be connected to media content source 102, media encoder 104, media metadata source 106, storage device, and transcoder 112 through communications paths 120, 122, 124, 126, and 128, respectively. In some embodiments, storage device 110 can be connected to transcoder 112 through communications path 130.

Communications paths 116, 118, 120, 122, 124, 126, 128, and 130 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths, in some embodiments.

Figure 2:
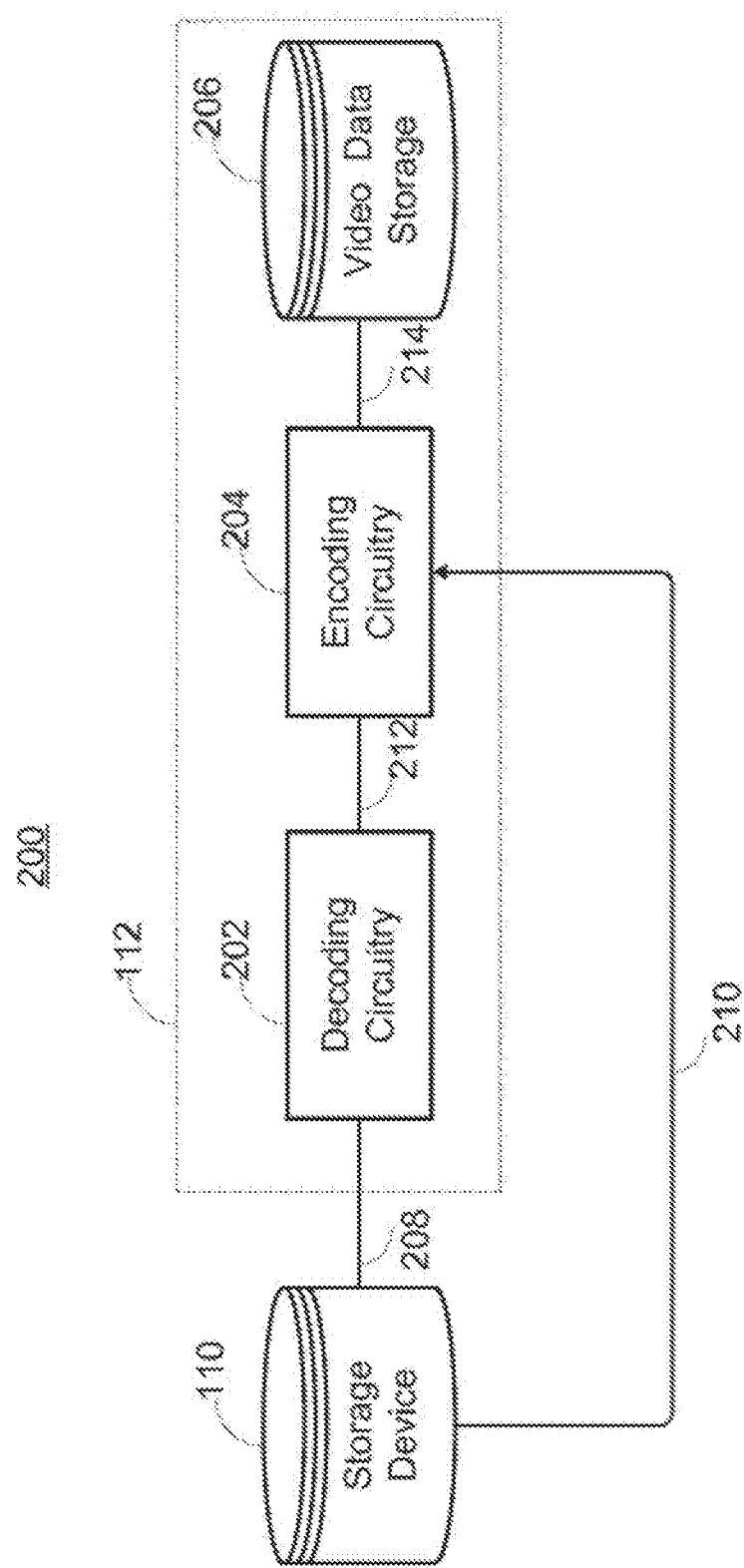
FIG. 2 shows a block diagram of an example of storage device and transcoder in accordance with some embodiments of the invention.

Turning to FIG. 2, a block diagram of an example 200 of storage device 110 and transcoder 112 of FIG. 1 in accordance with some embodiments of the disclosure is shown.

As illustrated, transcoder 112 may include a decoding circuitry 202, an encoding circuitry 204, a video-data storage 206, and communication paths 208, 210, 212, and 214.

Decoding circuitry 202 can include any suitable circuitry that is capable of performing video decoding. For example, decoding circuitry 202 can include one or more decoders that can decode a set of encoded images based on a suitable coding standard, such as MPEG-2, MPEG-4, AVC, H.263, H.264, HEVC, etc.

Encoding circuitry 204 can include any suitable circuitry that is capable of performing video encoding. For example, encoding circuitry 204 can include one or more suitable encoders that can encode a set of images based on a suitable coding standard, such as MPEG-2, MPEG-4, AVC, H.263, H.264, HEVC, etc. In some embodiments, encoding circuitry 204 can also include scaler circuitry for upconverting and/or downconverting content into a preferred output format.

Decoding circuitry 202 can be connected to encoding circuitry 204 through communication path 210. Encoding circuitry 204 can be connected to video storage 206 through communication path 214. Transcoder 112 may be connected to media storage 110 through communication paths 208 and 212.

Each of decoding circuitry 202 and encoding circuitry 204 can include any suitable processing circuitry. As referred to herein, processing circuitry can be any suitable circuitry that includes one or more microprocessors, microcontrollers, digital signal processors, programmable logic devices, field-programmable gate arrays (FPGAs), application-specific integrated circuits (ASICs), hardware processors, etc., and may include a multi-core processor (e.g., dual-core, quad-core, hexa-core, or any suitable number of cores) or a supercomputer, in some embodiments. In some embodiments, processing circuitry may be distributed across multiple separate processors or processing units, such as, for example, multiple of the same type of processing units (e.g., two Intel Core i7 processors) or multiple different processors (e.g., an Intel Core i5 processor and an Intel Core i7 processor).

Video data storage 206 can be any suitable digital storage mechanism in some embodiments. For example, video data storage 206 can include any device for storing electronic data, program instructions, computer software, firmware, register values, etc., such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Video data storage 206 may be used to store media content, media guidance data, executable instructions (e.g., programs, software, scripts, etc.) for providing an interactive media guidance application, and for any other suitable functions, and/or any other suitable data or program code, in accordance with some embodiments. Nonvolatile memory may also be used (e.g., to launch a boot-up routine and other instructions), in some embodiments.

Each of storage device 110, decoding circuitry 202, encoding circuitry 204, and video-data storage 206 can be provided as a stand-alone device or integrated with other components of architecture 200.

In some embodiments, storage device 110 can be connected to decoding circuitry 202 and encoding circuitry 204 through path paths 208 and 210, respectively. In some embodiments, decoding circuitry 202 can be connected to encoding circuitry 204 through communications path 212. In some embodiments, encoding circuitry 204 can be connected to video-data storage 206 through communications path 214.

Communications paths 208, 210, 212, and 214 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths, in some embodiments In some embodiments, transcoder 112 can also include a demultiplexer circuitry (not shown in FIG. 2). The demultiplexer circuitry can be any suitable circuitry that is capable of demultiplexing a media content transport stream (TS). For example, the demultiplexer circuitry can receive a TS from storage 110 and demultiplex the TS into a video stream, an audio stream, program and system information protocol data stream, etc. The demultiplexer circuitry can also pass the video stream to decoding circuitry 202.

Figure 3:
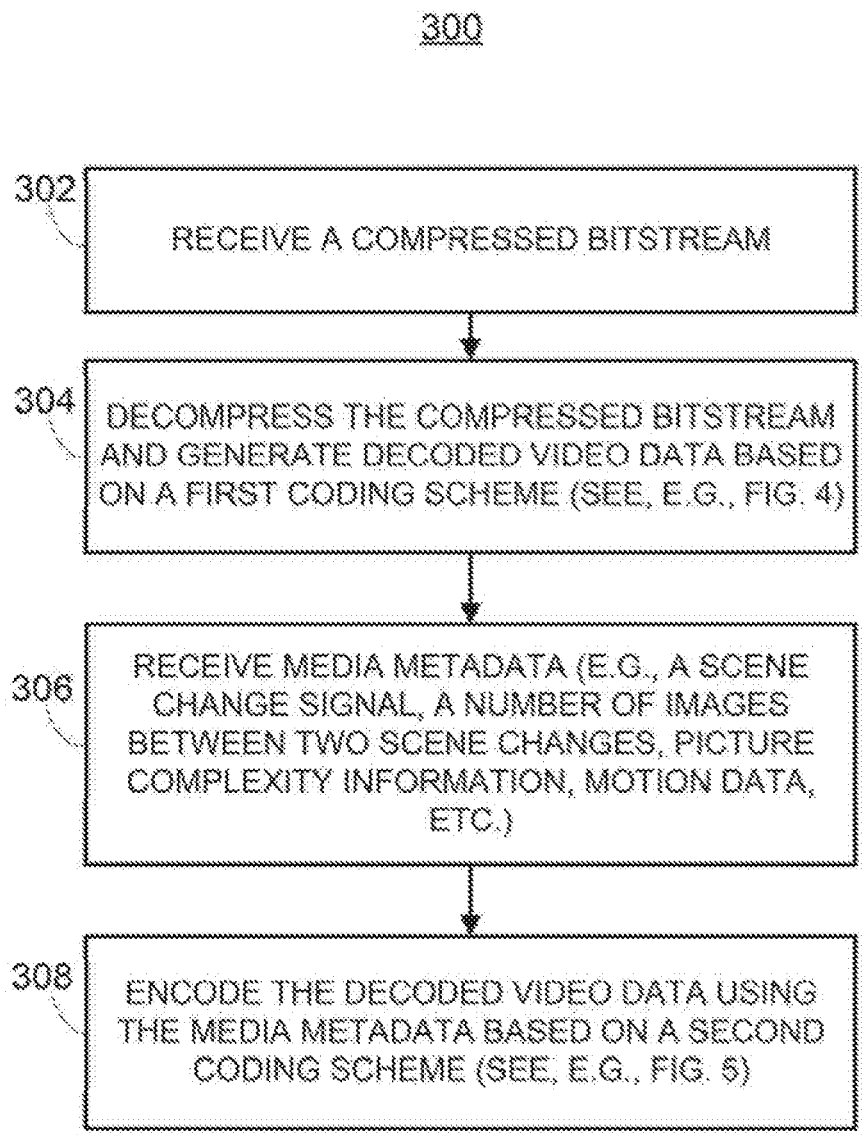
FIG. 3 shows a flow chart of an example of a process for transcoding video data in accordance with some embodiments of the invention.

Turning to FIG. 3, a flow chart of an example 300 of a process for transcoding video data in accordance with some embodiments of the disclosure is shown. In some embodiments, process 300 can be implemented by transcoder 112 as illustrated in FIGS. 1 and 2.

As illustrated, process 300 can start by receiving a compressed bitstream at 302. The compressed bitstream can include any suitable data and can be received in any suitable manner. For example, the compressed bitstream can include video data generated based on any suitable coding standard, such as Motion JPEG, JPEG, MPEG-2, MPEG-4, H.263, H.264, HEVC, etc. More particularly, for example, the video data can include encoded images, decoding parameters, header information, etc. In some embodiments, each of the encoded images can include one or more quantized transform coefficients.

In some embodiments, for example, the compressed bitstream can be received from storage 110 as illustrated in FIGS. 1 and 2. Alternatively or additionally, the compressed bitstream can be received from media encoder 104 and/or media content source 102.

Next, at 304, transcoder 112 can decompress the compressed bitstream and generate decoded video data. The compressed bitstream can be decompressed and the decoded video data can be generated in any suitable manner. For example, transcoder 112 can decompress the compressed bitstream and generate multiple decoded images based on a suitable coding standard, such as Motion JPEG, JPEG 2000, MPEG-2, MPEG-4, H.263, H.264, HEVC, etc. In some embodiments, the decoded images can have any suitable color format, such as RGB, YCrCb, YUV, etc.

Figure 4:
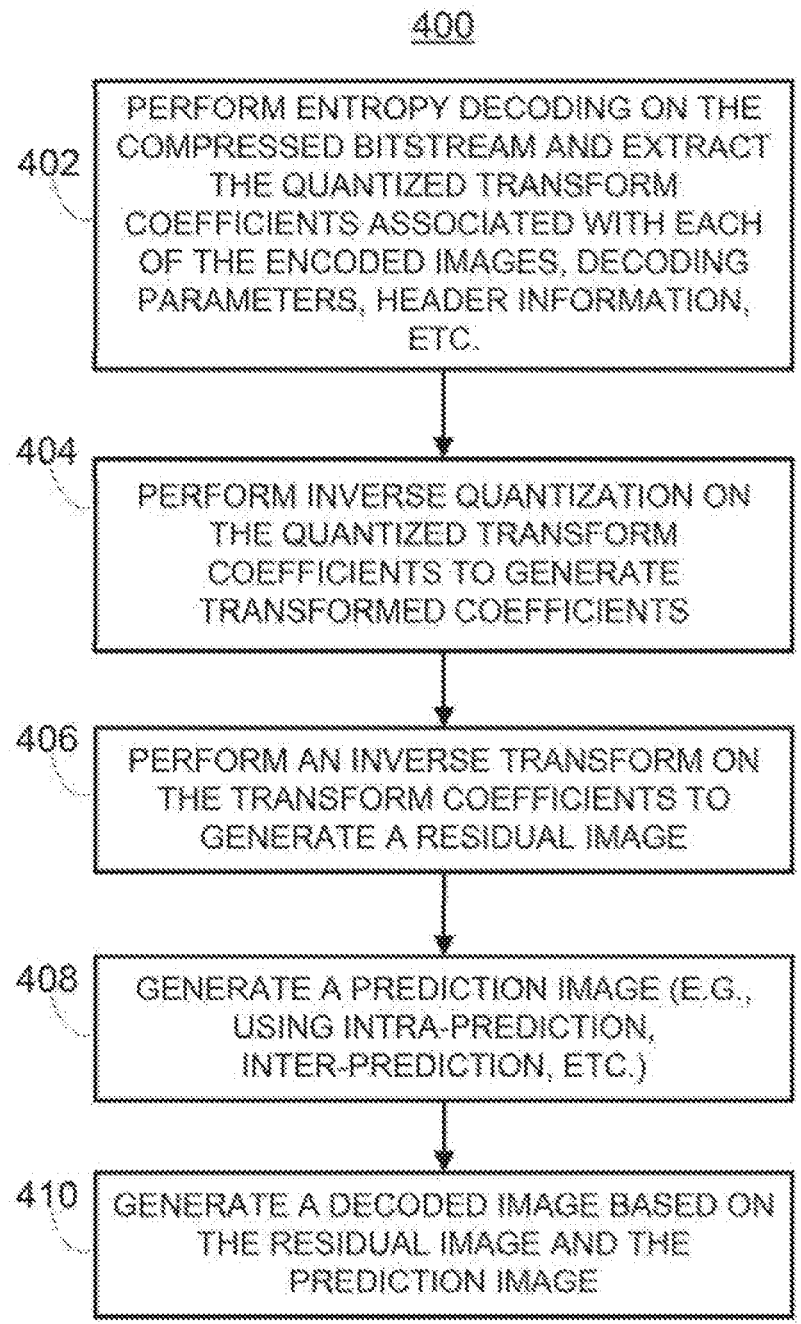
FIG. 4 shows a flow chart of an example of a process for decoding video data in accordance with some embodiments of the invention.

More particularly, for example, each of the decoded images can be generated using a process 400 as illustrated in FIG. 4. In some embodiments, for example, process 400 can be implemented by decoding circuitry 202 of transcoder 112 (FIG. 2).

As shown, at 402, decoding circuitry 202 can perform entropy decoding on the compressed bitstream and extract the quantized transform coefficients associated with each of the encoded images, decoding parameters (e.g., quantization parameters, coding modes, macroblock partition information, motion vectors, reference lists, etc.), header information, etc.

At 404, decoding circuitry 202 can perform inverse quantization on the quantized transformed coefficients associated with a current encoded image to generate one or more transform coefficients. The inverse quantization can be performed in any suitable manner. For example, decoding circuitry 202 can multiply each of the quantized transform coefficients by a suitable quantization parameter. In some embodiments, for example, decoding circuitry 202 can obtain the quantization parameter from the decoding parameters.

At 406, decoding circuitry 202 can perform an inverse transform on the transform coefficients to generate a decoded residual image for the current encoded image. The inverse transform can be performed in any suitable manner. For example, the inverse transform can be an inverse Discrete Cosine Transform (IDCT).

Next, at 408, decoding circuitry 202 can generate a prediction image for the current encoded image. The prediction image can be calculated in any suitable manner. For example, decoding circuitry 202 can generate the prediction image based on a suitable inter-prediction method by referring to one or more previously decoded frames. More particularly, for example, decoding circuitry 202 can perform motion compensation on one or more previously decoded frames and produce a motion compensated reference image as the prediction image. In a more particular example, decoding circuitry 202 can locate a previously decoded image or a portion of the previously decoded image as a reference image for the current encoded image using a motion vector. The reference image can then be used as the motion compensated prediction for the current image. In another more particular example, decoding circuitry 202 can locate two reference images for the current encoded image using one or more motion vectors. Decoding circuitry 202 can then calculate a prediction image for the current encoded image based on the reference images. More particularly, for example, the prediction image can be a weighted prediction of the two reference images.

As another example, decoding circuitry 202 can generate the prediction image based on a suitable intra-prediction method by referring to one or more previously decoded pixels in the same frame. More particularly, for example, decoding circuitry 202 can perform spatial extrapolation to produce an intra-prediction image for the current encoded image. In some embodiments, one or more prediction images can be formed by extrapolating previously decoded pixels of the current frame in any suitable direction, such as vertical, horizontal, diagonal down-left, diagonal down-right, vertical-left, horizontal-down, vertical right, horizontal-up, etc.

At 410, decoding circuitry 202 can generate a decoded image for the current encoded image based on the residual image and the prediction image. The decoded image can be generated in any suitable manner. For example, decoding circuitry 202 can add the prediction image to the decoded residual image to produce the decoded image.

Turning back to FIG. 3, at 306, transcoder 112 can receive media metadata. The media metadata can include any suitable data and can be received in any suitable manner. For example, the media metadata can be the metadata produced by media metadata source 106, as described above in connection with FIG. 1. More particularly, for example, the media metadata can include information about video scenes (e.g., scene change information, the number of the frames between scene changes, the type of a scene change, the number of B-frames between two P-frames, picture complexity information, etc.), motion data about the media content (e.g., motion vector maps, reference lists, etc.), intra-prediction data (e.g., a set of candidate intra-prediction modes, the coding cost and/or distortion corresponding to each candidate intra-prediction mode, etc.), etc.

In some embodiments, for example, encoding circuitry 204 (FIG. 2) can receive the media metadata from storage 110. In some embodiments, encoding circuitry 204 can receive the media metadata from media metadata source 106 through communications network 108 as illustrated in FIG. 1.

At 308, transcoder 112 can encode the decoded video data using the media metadata based on a second coding scheme. The decoded video data can be encoded in any suitable manner. For example, transcoder 112 can encode the decoded images into a set of encoded images based on any suitable coding standard, such as MPEG-2, MPEG-4, H.263, H.264, HEVC, etc. As another example, transcoder 112 can encode the decoded video data into a compressed bitstream including a set of encoded images that has a given bitrate. As yet another example, encoding circuitry 204 can encode the decoded images into a set of encoded images that has a given resolution, such as a spatial resolution, a temporal resolution, a quality resolution, etc.

Figure 5:
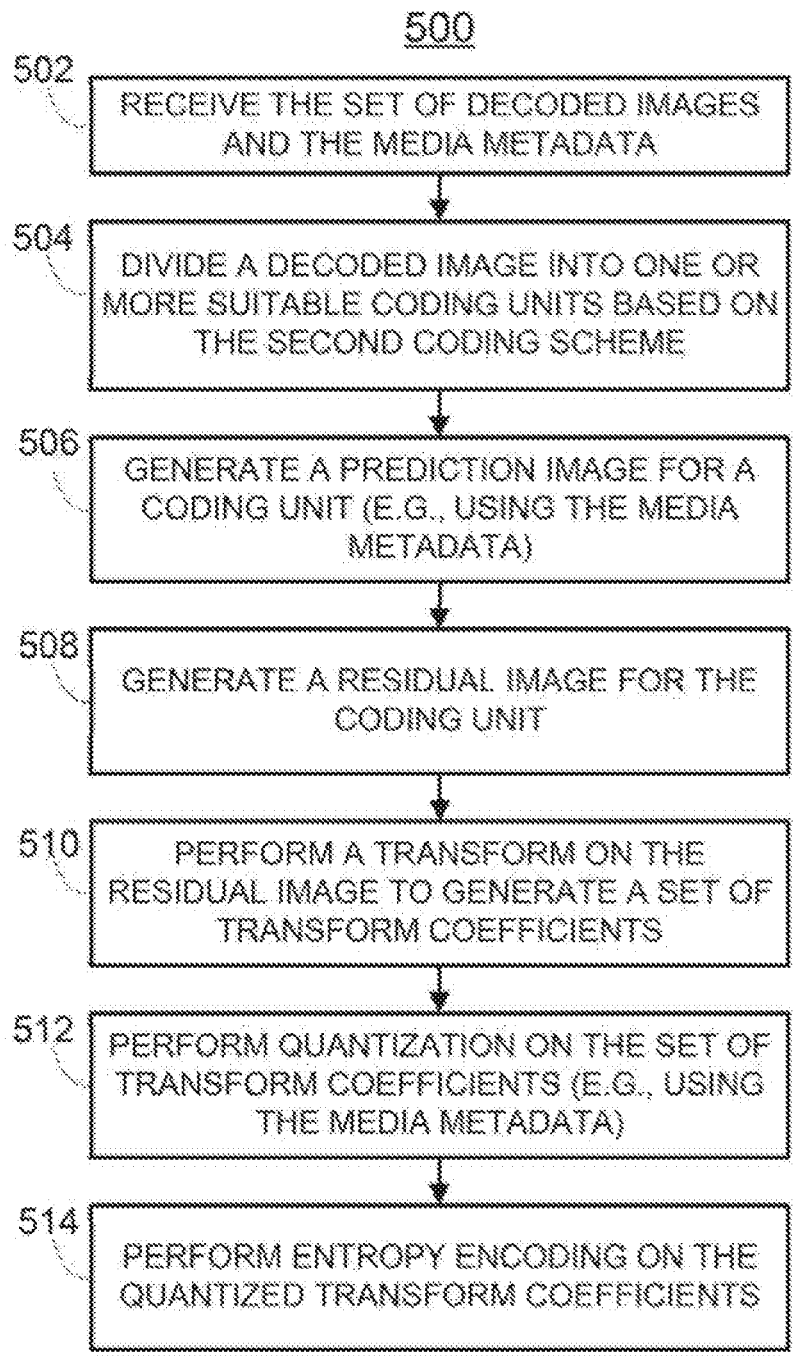
FIG. 5 shows a flow chart of an example of a process for encoding video data in accordance with some embodiments of the invention.

More particularly, for example, transcoder 112 can generate each of the encoded images using a process 500 as illustrated in FIG. 5. In some embodiments, process 500 can be implemented by encoding circuitry 204 of transcoder 112.

At 502, encoding circuitry 204 can receive the set of decoded images and the media metadata. The set of decoded images and the media metadata can be received in any suitable manner. For example, encoding circuitry 204 can receive the set of decoded images from the decoding circuitry 202 and receive the media metadata from storage device 110.

At 504, encoding circuitry 204 can divide a decoded image into one or more suitable coding units based on the second coding scheme. Each of the coding units can have any suitable size and shape and can be obtained in any suitable manner. In some embodiments, for example, the second coding scheme can include the HEVC coding standard. Encoding circuitry 204 can divide a video frame into multiple coding tree units (CTU), each of which can have a size of 8×8, 16×16, 32×32, 64×64, etc. In some embodiments, each of the CTUs can be partitioned into multiple coding tree blocks (CTBs), each of which can have a size of 4×4, 8×8, 16×16, etc. based on the size of the CTU. In some embodiments, each of the CTBs can be further partitioned into multiple coding blocks (CBs) and coding units (CUs).

At 506, encoding circuitry 204 can generate a prediction image for a coding unit. The prediction image can be generated in any suitable way. For example, encoding circuitry 204 can generate the prediction image based on the media metadata such as scene change information, motion data, picture complexity information, intra-prediction information, etc.

In some embodiments, for example, encoding circuitry 204 can generate the prediction image based on a suitable inter-prediction method by referring to one or more reference images. More particularly, for example, encoding circuitry 204 can calculate one or more suitable motion vectors for the coding unit based on the motion vector map corresponding to the coding unit. Encoding circuitry 204 can then generate a motion compensated prediction image for the coding unit based on the motion vectors by referring to one or more reference images. In some embodiments, the motion compensated prediction image can be generated based on one reference frame that can be located using the reference frame lists. For example, encoding circuitry 204 can locate a region in the reference frame as a reference image for the coding unit based on a motion vector. The reference image can then be used as a prediction image for the coding unit. In some embodiments, the motion compensated prediction image can be generated based on two reference frames that can be located using the reference frame lists. For example, encoding circuitry 204 can generate two reference images by locating a region in each of the two reference frames, respectively, based on one or more motion vectors. Encoding circuitry 204 can then produce a prediction for the coding unit using the two reference images. More particularly, for example, the prediction for the coding unit can be a weighted prediction of the two reference images.

In some embodiments, encoding circuitry 204 can generate the predicted image based on a suitable intra-prediction method. The intra-prediction can be performed in any suitable manner. For example, encoding circuitry 204 can generate an intra-prediction image for the coding unit based on the media metadata, such as the intra-prediction data including the set of candidate intra-prediction modes, the coding cost and/or distortion corresponding to each intra-prediction mode, etc. More particularly, for example, encoding circuitry 204 can determine a sub-set of the candidate intra-prediction modes that can be used in accordance with the second coding scheme. Additionally, encoding circuitry 204 can select an intra-prediction mode from the sub-set of candidate intra-prediction modes based on the coding costs and/or distortion corresponding to each of the sub-set of candidate intra-prediction modes. Encoding circuitry 204 can then generate a prediction image for the coding unit based on the selected intra-prediction mode. More particularly, for example, encoding circuitry 204 can predict each pixel of the coding unit by extrapolating pixel samples in a direction defined by the intra-prediction mode.

At 508, encoding circuitry 204 can generate a residual image for the coding unit. The residual image can be generated in any suitable manner. For example, the residual image can be generated at 506 by subtracting the prediction image generated at from the original image of the coding unit.

At 510, encoding circuitry 204 can perform a transform on the residual image and generate a set of transform coefficients. The set of transform coefficients can be generated in any suitable manner. For example, encoding circuitry 204 can perform a Discrete Cosine Transform (DCT) on the residual image and generate a set of DCT coefficients.

At 512, encoding circuitry 204 can perform quantization on the set of transform coefficients. The quantization can be performed in any suitable manner. For example, encoding circuitry 204 can determine a suitable quantization parameter (QP) for a coding unit based on a target bitrate of the second coding scheme. Encoding circuitry 204 can then quantize the transform coefficients using the QP. The target bitrate can be any suitable bitrate, such as a constant bitrate, a variable bitrate, etc. A QP can be determined in any suitable manner. In some embodiments, for example, encoding circuitry 204 can reduce the bitrate of a compressed bitstream by increasing QP or increase the bitrate of a compressed bitstream by decreasing QP. In some embodiments, for example, an I-frame can be encoded using most bits, followed by a P-frame and a B-frame.

In some embodiments, encoding circuitry 204 can determine a QP based on the media metadata (e.g., scene change information, the number of frames between two scenes, the type of each scene change, picture complexity information, etc.), the target bitrate in accordance with the second coding scheme, etc.

For example, encoding circuitry 204 can determine a QP for a group of pictures (GOP) based on the media metadata. The QP can be determined for the GOP in any suitable manner. More particularly, for example, encoding circuitry 204 can determine the structure of a GOP (e.g., the length of the GOP, the distance between P-frames, the distance between I-frames, etc.) based on the media metadata and determine the QP for the GOP based on the structure of the GOP.

In some embodiments, encoding circuitry 204 can calculate the number of bits available to encode the GOP based on the structure of a GOP, the frame rate of the video data, the target rate, etc. Encoding circuitry 204 can then calculate a QP for the GOP based on the number of bits available to encode the GOP. More particularly, for example, the QP can be calculated based on a suitable model that can define the relation between the QP and the target rate, such as a rate-distortion model, a rate-distortion optimization model, etc.

In some embodiments, encoding circuitry 204 can determine the structure of GOP based on the media metadata, such as scene information, the number of frames between two scene changes, the number of B-frames between two P-frames, etc.

In a more particular example, the first frame of the GOP can be an I-frame that can be located using the scene change information. More particularly, for example, the first frame of the GOP can correspond to the start of a video scene.

In another more particular example, the length of the GOP, i.e., the number of frames in the GOP, can be determined based on the number of frames between two scene changes. In some embodiments, the length of the GOP can be equal to the number of frames between two adjacent scene changes. In some embodiments, the length of the GOP can be equal to the number of frames between two given scene changes, e.g., two shot changes, etc.

In yet another more particular example, the distance between P-frames in the GOP can be determined based on the number of B-frames between two P-frames included in the media metadata. In a more particular example, the GOP can include a set of frames IBBPBBBP . . . where the distance between P-frames is three.

As another example, encoding circuitry 204 can determine a QP for the coding unit based on the media metadata. More particularly, for example, encoding circuitry 204 can determine the complexity of the coding unit using the picture complexity information (e.g., the maps of spatial complexity, the maps of motion complexity, etc.). Encoding circuitry 204 can then calculate a target number of bits that are available to encode the coding unit based on the complexity of the coding unit. In some embodiments, for example, more bits can be allocated to a coding unit having relatively high complexity while fewer bits can be allocated to a coding unit having relatively lower complexity.

Additionally, encoding circuitry 204 can determine a QP for the coding unit to produce the target number of bits. More particularly, for example, the QP can be calculated based on a suitable model that can define the relation between the QP and the target rate, such as a rate-distortion model, a rate-distortion optimization model, etc.

Next, at 514, encoding circuitry 204 can perform entropy encoding on the quantized transform coefficients. The entropy encoding can be performed in any suitable manner. For example, encoding circuitry 204 can perform the entropy encoding using a suitable variable length encoding method.

It should be noted that the above steps of the flow diagrams of FIGS. 3-5 may be executed or performed in any order or sequence not limited to the order and sequence shown and described in the figures. Furthermore, it should be noted, some of the above steps of the flow diagrams of FIGS. 3-5 may be executed or performed substantially simultaneously where appropriate or in parallel to reduce latency and processing times. And still furthermore, it should be noted, some of the above steps of the flow diagrams of FIGS. 3-5 may be omitted.

In some embodiments, any suitable computer readable media can be used for storing instructions for performing the mechanisms and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

The above described embodiments of the present disclosure are presented for purposes of illustration and not of limitation, and the present disclosure is limited only by the claims which follow.

What is claimed is:

1. A method for transcoding a source video file into a set of multiple alternate video streams, the method comprising:
    generating, at a computer system configured as a media metadata generation device, media metadata related to the source video file prior to decoding, during a transcoding of, at least a portion of the source video file, where the media metadata comprises scene complexity information;
    providing information based on the media metadata from the computer system to a plurality of transcoding devices; and
    performing the following at each of the plurality of transcoding devices in parallel:
        receiving the at least a portion of the source video file, including a first plurality of encoded images encoded according to a source format, from a media content source;
        decoding the at least a portion of the source video file based on the source format to generate a decoded portion of video including a plurality of decoded images;
        receiving the information based on the media metadata from the computer system; and
        encoding the plurality of decoded images of the decoded portion of video into an alternate video stream including a second plurality of encoded images based on a target format and the information based on the media metadata, the alternate video stream being one of the set of multiple alternate video streams.

2. The method of claim 1, wherein a group of the plurality of transcoding devices perform processes in parallel for the same alternate video stream from the set of multiple alternate video streams.

3. The method of claim 1, wherein a group of the plurality of transcoding devices perform processes in parallel for different alternate video streams in the set of multiple alternate video streams.

4. The method of claim 1, wherein the media metadata further comprises scene change information indicating the start and end of a scene.

5. The method of claim 1, wherein the encoding of the plurality of decoded images of the decoded portion of video into an alternate video stream includes performing at least the following operations for images in the plurality of decoded images:
    generating a prediction image for each of a plurality of coding units of an image in the plurality of decoded images using the scene change information and the scene complexity information within the information based on the media metadata according to the target format;
    performing transforms on residual images of the plurality of coding units to generate sets of transform coefficients based on the target format; and
    performing entropy encoding on the sets of transform coefficients to generate images for the second plurality of encoded images.

6. The method of claim 1, by further performing the following at each of the plurality of transcoding devices in parallel:
    performing quantization on the sets of transform coefficients for an image in the plurality of decoded images based at least in part on the scene complexity information within the information based on the media metadata; and
    quantizing the generated set of transform coefficients according to the target format.

7. The method of claim 4, by further performing the following at each of the plurality of transcoding devices in parallel:
    determining a number of bits to encode a group of pictures (GOP) based at least in part on a number of frames between the start and end of a scene as indicated by the information based on the media metadata.

8. The method of claim 1, wherein the source format and the target format have different resolutions.

9. The method of claim 1, wherein the source format and the target format correspond to different video encoding standards.

10. The method of claim 1, by further performing the following at each of the plurality of transcoding devices in parallel:
    dividing an image in the plurality of decoded images into a plurality of coding units based on the target format.

11. A system for transcoding video data, the system comprising:

a computer system configured as a media metadata generation device, wherein the computer system is configured to:
    generate media metadata related to the source video file prior to decoding, during a transcoding of, at least a portion of the source video file, where the media metadata comprises scene complexity information; and
    provide information based on the media metadata to a plurality of transcoding devices; and
the plurality of transcoding devices, configured to perform the following at each of the plurality of transcoding devices in parallel:
    receive the at least a portion of the source video file, including a first plurality of encoded images encoded according to a source format, from a media content source;
    decode the at least a portion of the source video file based on the source format to generate a decoded portion of video including a plurality of decoded images;
    receive the information based on the media metadata from the computer system; and
    encode the plurality of decoded images of the decoded portion of video into an alternate video stream including a second plurality of encoded images based on a target format and the information based on the media metadata, the alternate video stream being one of the set of multiple alternate video streams.

12. The system of claim 11, wherein a group of the plurality of transcoding devices perform processes in parallel for the same alternate video stream from the set of multiple alternate video streams.

13. The system of claim 11, wherein a group of the plurality of transcoding devices perform processes in parallel for different alternate video streams in the set of multiple alternate video streams.

14. The system of claim 11, wherein the media metadata further comprises scene change information indicating the start and end of a scene.

15. The system of claim 11, wherein encoding the plurality of decoded images of the decoded portion of video into an alternate video stream is performed using at least the following operations for images in the plurality of decoded images:
    generating a prediction image for each of a plurality of coding units of an image in the plurality of decoded images using the scene change information and the scene complexity information within the information based on the media metadata according to the target format;
    performing transforms on residual images of the plurality of coding units to generate sets of transform coefficients based on the target format; and
    performing entropy encoding on the sets of transform coefficients to generate images for the second plurality of encoded images.

16. The system of claim 11, wherein the plurality of transcoding devices are configured to further perform the following at each of the plurality of transcoding devices in parallel:
    performing quantization on the sets of transform coefficients for an image in the plurality of decoded images based at least in part on the scene complexity information within the information based on the media metadata; and
    quantizing the generated set of transform coefficients according to the target format.

17. The system of claim 14, wherein the plurality of transcoding devices are configured to further perform the following at each of the plurality of transcoding devices in parallel:
    determining a number of bits to encode a group of pictures (GOP) based at least in part on a number of frames between the start and end of a scene as indicated by the information based on the media metadata.

18. The system of claim 11, wherein the plurality of transcoding devices are configured to further perform the following at each of the plurality of transcoding devices in parallel:
    dividing an image in the plurality of decoded images into a plurality of coding units based on the target format.

19. The system of claim 11, wherein the source format and the target format have different resolutions.

20. The system of claim 11, wherein the source format and the target format correspond to different video encoding standards.

21. A method for transcoding a source video file into a set of multiple alternate video streams, the method comprising:
    generating, at a computer system configured as a media metadata generation device, media metadata related to the source video file prior to decoding, during a transcoding of, at least a portion of the source video file, where the media metadata comprises scene change information indicating the start and end of a scene, and scene complexity information;
    providing information based on the media metadata from the computer system to a plurality of transcoding devices; and
    performing the following at each of the plurality of transcoding devices in parallel:
        receiving the at least a portion of the source video file, including a first plurality of encoded images encoded according to a source format, from a media content source;
        decoding the at least a portion of the source video file based on the source format to generate a decoded portion of video including a plurality of decoded images;
        receiving the information based on the media metadata from the computer system;
        dividing an image in the plurality of decoded images into a plurality of coding units based on a target format, wherein the source format and the target format have different resolutions;
        determining a number of bits to encode a group of pictures (GOP) based at least in part on a number of frames between the start and end of a scene as indicated by the information based on the media metadata; and
        encoding the plurality of decoded images of the decoded portion of video into an alternate video stream including a second plurality of encoded images based on the target format and the information based on the media metadata, the alternate video stream being one of the set of multiple alternate video streams.

* * * * *